(12) United States Patent
Ediger et al.

(10) Patent No.: US 9,099,010 B2
(45) Date of Patent: Aug. 4, 2015

(54) CONTENT AUTHORING APPLICATION

(75) Inventors: Jason David Ediger, Los Gatos, CA (US); Eric B. Bailey, Sunnyvale, CA (US); William Martin Bachman, San Jose, CA (US); Alan C. Cannistraro, San Francisco, CA (US); Michael John Nino, San Jose, CA (US); Matthew Kenjiro Fukuda, San Francisco, CA (US); Elbert D. Chen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 85 days.

(21) Appl. No.: 13/274,272

(22) Filed: Oct. 14, 2011

(65) Prior Publication Data

US 2013/0095463 A1 Apr. 18, 2013

(51) Int. Cl.
*G09B 25/00* (2006.01)
*G09B 5/06* (2006.01)
*G06F 3/0481* (2013.01)

(52) U.S. Cl.
CPC ............... *G09B 5/06* (2013.01); *G06F 3/0481* (2013.01)

(58) Field of Classification Search
CPC .......... G09B 5/00; G09B 19/00; G06F 3/048; G06F 3/0481; G06F 3/0482
USPC .......... 434/350, 365, 362, 322, 323; 715/200, 715/224
See application file for complete search history.

(56) References Cited

U.S. PATENT DOCUMENTS

| 5,483,261 | A | 1/1996 | Yasutake |
|---|---|---|---|
| 5,488,204 | A | 1/1996 | Mead et al. |
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 6,965,752 | B2 | 11/2005 | Allen et al. |

(Continued)

FOREIGN PATENT DOCUMENTS

| JP | 2000-163031 A | 6/2000 |
|---|---|---|
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Peter Egloff
(74) *Attorney, Agent, or Firm* — Morrison & Foerster LLP

(57) ABSTRACT

This disclosure describes systems, methods, and computer program products for authoring content for e-learning courses, such as network-enabled (e.g., Web-based) education courses. Graphical user interfaces (GUIs) provide an instructor with user interface elements to manage online course content. Using the GUIs, the instructor can create in-session and self-paced courses that can be delivered over a network to any number of student operated client devices. The instructor is provided a suite of editing tools that can be used to create and edit pages of content for a course, including adding links and multimedia, information pages, posts and course materials. The GUI can include a side bar that can display descriptors that can be used by the instructor to navigate pages of the course.

39 Claims, 29 Drawing Sheets

(56) References Cited

U.S. PATENT DOCUMENTS

| | | | |
|---|---|---|---|
| 6,988,138 B1* | 1/2006 | Alcorn et al. | 709/225 |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,296,673 B2* | 10/2012 | Lipstein et al. | 715/777 |
| 8,479,122 B2 | 7/2013 | Hotelling et al. | |
| 2002/0182578 A1 | 12/2002 | Rachman et al. | |
| 2004/0030781 A1 | 2/2004 | Etesse et al. | |
| 2005/0266388 A1* | 12/2005 | Gross et al. | 434/350 |
| 2006/0026521 A1 | 2/2006 | Hotelling et al. | |
| 2006/0172274 A1* | 8/2006 | Nolasco | 434/350 |
| 2006/0197753 A1 | 9/2006 | Hotelling | |
| 2008/0221963 A1* | 9/2008 | Altshule et al. | 705/9 |
| 2008/0241809 A1* | 10/2008 | Ashmore et al. | 434/307 R |
| 2009/0035733 A1 | 2/2009 | Meitar et al. | |
| 2010/0151431 A1 | 6/2010 | Miller | |
| 2010/0280930 A1* | 11/2010 | Barazanji | 705/34 |
| 2011/0212430 A1* | 9/2011 | Smithmier et al. | 434/322 |

OTHER PUBLICATIONS

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Chinese Search Report mailed Dec. 25, 2014, for CN Patent Application No. 201210517394.9, filed Sep. 28, 2012, two pages.

* cited by examiner

| | | VIRTUAL U | | |
|---|---|---|---|---|
| | HTTP://WWW.VIRTUALU.COM/COURSEMANAGER | | | |
| | APPLE MAPS NEWS (10) ▼ POPULAR ▼ | | | |
| PHYSICS I: CLASSICAL MECHANICS | INFO POSTS MATERIALS | | | JAMES WILSON ▼ |

ENROLLED STUDENTS (11)

| | NAME ▲ | EMAIL ADDRESS | ENROLL DATE | LAST VISIT | REMOVE |
|---|---|---|---|---|---|
| 1 | GEORGE BAKER | GEORGE.R.BAKER@MISSIONCOLLEGE.EDU | SEPT 9, 2011 | SEPT 16, 2011 | |
| 2 | JOHNNY CHAN | JOHN.CHAN@MISSIONCOLLEGE.EDU | SEPT 11, 2011 | SEPT 15, 2011 | |
| 3 | MARCELLA DAREUS | MARY.DAREUS@MISSIONCOLLEGE.EDU | SEPT 8, 2011 | SEPT 14, 2011 | |
| 4 | CAMERON HEYWARD | HEYWARD@ME.COM | SEPT 7, 2011 | SEPT 13, 2011 | |
| 5 | COREY LIUGET | LIUGET@ME.COM | SEPT 7, 2011 | SEPT 13, 2011 | |
| 6 | MARY MADISON | MARY.MADISON@MISSIONCOLLEGE.EDU | SEPT 7, 2011 | SEPT 13, 2011 | |
| 7 | CAM NEWTON | NEWTON@ME.COM | SEPT 7, 2011 | SEPT 13, 2011 | |
| 8 | LISA OSTERTAG | LISA.MARIE.OSTERTAG@MISSIONCOLLEGE.EDU | SEPT 7, 2011 | SEPT 12, 2011 | |
| 9 | PATRICK PETERSON | PPETERSON@ME.COM | SEPT 7, 2011 | SEPT 21, 2011 | |
| 10 | ROBERTA QUINN | ROBERTAQUINN@ME.COM | SEPT 7, 2011 | SEPT 24, 2011 | |
| 11 | DEREK SHERROD | DEREKSHERROD@ME.COM | SEPT 7, 2011 | | |

REMOVED STUDENTS (1)

| | NAME ▲ | EMAIL ADDRESS | DATE REMOVED | LAST VISIT | REMOVE |
|---|---|---|---|---|---|
| 1 | ARNOLD GREEN | GREEN@ME.COM | SEPT 22, 2011 | SEPT 13, 2011 | |

CONTENT AUTHORING APPLICATION

TECHNICAL FIELD

This disclosure is related generally to electronic learning ("e-learning").

BACKGROUND

Web-based instruction (WBI) is a network-enabled transfer of skills and knowledge using computer applications and processes. Online education courses delivered through networks (e.g., the Internet, intranet/extranet) can be self-paced or led by an instructor, and include various types of media, such as text, images, animation, streaming video and audio. Content for WBI can be developed by instructors using content authoring applications. Since instructors may not be computer savvy, it is desirable that content authoring applications be intuitive and simple to use.

SUMMARY

This disclosure describes systems, methods, and computer program products for authoring content for e-learning courses, such as network-enabled (e.g., Web-based) education courses. Graphical user interfaces (GUIs) provide an instructor with user interface elements to manage online course content. Using the GUIs, the instructor can create in-session and self-paced courses that can be delivered over a network to any number of student operated client devices. The instructor is provided a suite of editing tools that can be used to create and edit pages of content for a course, including adding links and multimedia, information pages, posts and course materials. The GUI can include a side bar that can display descriptors that can be used by the instructor to navigate pages of the course.

In some implementations, GUIs are provided for allowing the instructor to post assignments with or without materials. A variety of material types can be attached, including but not limited to text documents, slideshows, video, digital photos and audio. When attaching materials, a variety of attachment options are provided, including but not limited to choosing from a materials list, uploading files, entering an online store through a link where the materials can be downloaded or entering a Web URL where the materials can be reviewed using a Web browser. Metadata for the attached materials can be edited or removed by the instructor, independent of other materials that may be attached to an assignment for the course.

In some implementations, a student list can be invoked by the instructor, which displays a list of enrolled and removed students. The student list can include a variety of information for each student, such as contact information (e.g., email address).

In some implementations, a method comprises: providing a first page for display at a device, the first page including user interface elements for authoring content for a network-enabled course, a first user interface element configured for authoring a post related to the course, a second user interface element configured for adding an assignment to the post and a third user interface element for attaching materials to the assignment; receiving input associated with one or more of the user interface elements; and enabling authoring the course content according to the input.

In some implementations, a system comprises one or more processors and memory coupled to the one or more processors. The memory is configured for storing instructions, which, when executed by the one or more processors, causes the one or more processors to perform operations. The operations comprise providing a first page for display at a device, the first page including user interface elements for authoring content for a network-enabled course, a first user interface element configured for authoring a post related to the course, a second user interface element configured for adding an assignment to the post and a third user interface element for attaching materials to the assignment; receiving input associated with one or more of the user interface elements; and enabling authoring the course content according to the input.

Other implementations are disclosed that are directed to methods, systems and computer-readable mediums.

Particular implementations of the network-enabled content authoring application disclosed herein provide one or more of the following advantages. The content authoring application is an intuitive and simple to use tool for creating and presenting network-enabled courses to students. The application includes GUIs that allow an instructor to create and edit a course, including user interface elements for adding and editing course assignments and attaching course materials.

The details of the disclosed implementations are set forth in the accompanying drawings and the description below. Other features, objects, and advantages will be apparent from the description and drawings, and from the claims.

DESCRIPTION OF DRAWINGS

FIG. 9B illustrates removing a student from the student enrollment page.

The same reference symbol used in various drawings indicates like elements.

DETAILED DESCRIPTION

The disclosure that follows describes a network-enabled content authoring application that provides instructors with a computer-based tool for creating, editing and managing educational course content for delivery over a network. A network-enabled content authoring application can be delivered by one or more server computers to one or more remotely located client devices using the World Wide Web ("the Web"). Although the disclosed implementations are network-enabled, the disclosed implementations can also be included in a "stand-alone" application running on a device.

Exemplary GUIs for Authoring Content

Figure 1A:
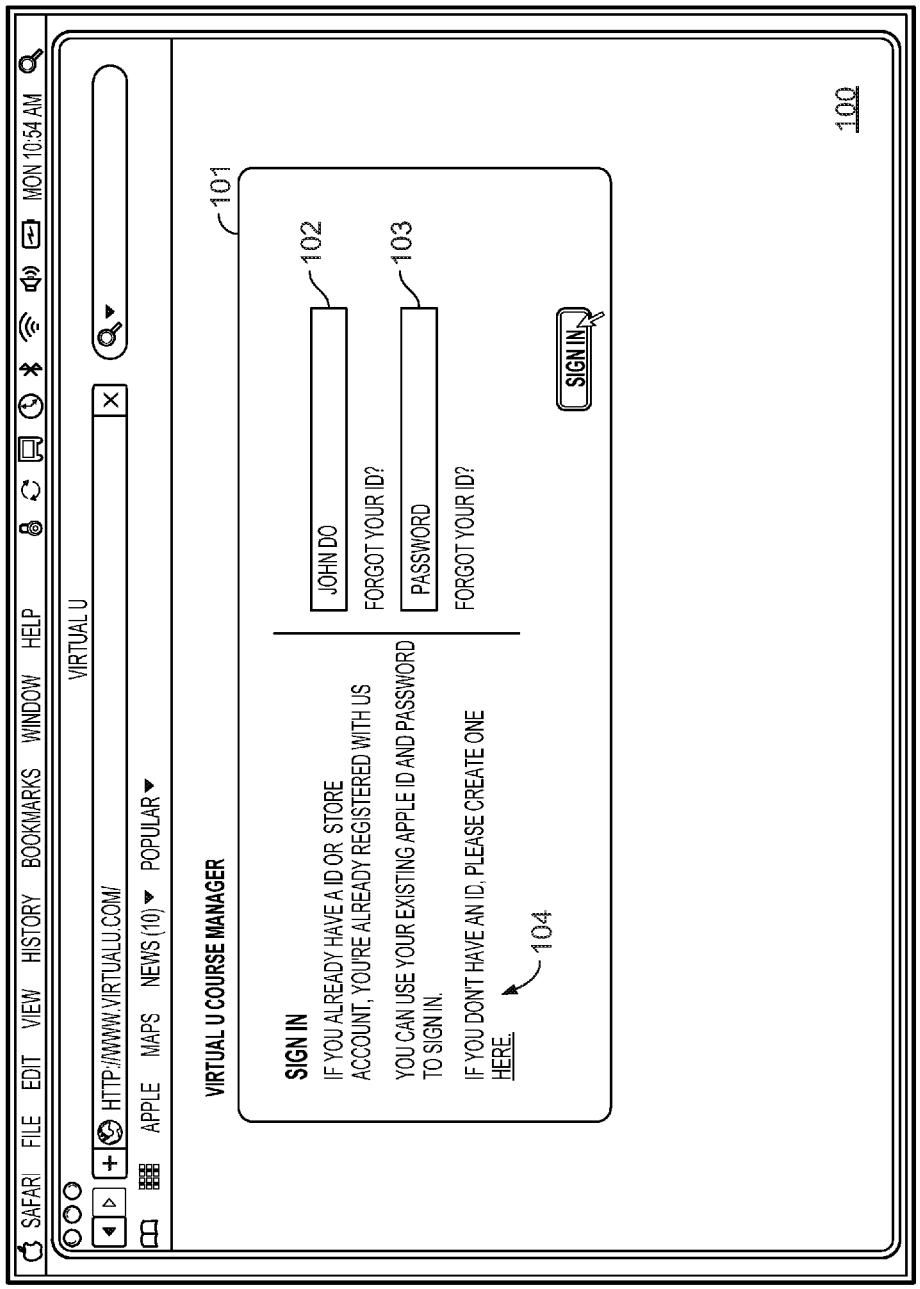
FIG. 1A illustrates an exemplary sign in page.

FIG. 1A illustrates an exemplary sign in window 101 for a network-enabled content authoring application. An instructor can use browser window 100 generated by a browser application running on a client device to sign into a course manager account operated by course management service. Text boxes 102, 103 in sign in window 101 can be used to enter an online ID and a password. Link 104 can be provided to allow a new user to register and create a new ID and password.

Some examples of client devices include but are not limited to, laptop computers, desktop computers, computer terminals, television systems, tablet computers, e-book readers and smart phones. A client device can include a touch-sensitive surface. The touch-sensitive surface can process multiple simultaneous points of input, including processing data related to the pressure, degree or position of each point of input. Such processing facilitates gestures with multiple fingers, including pinching and swiping.

Hereafter, when the detailed description refers "to select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radial buttons, checkboxes and any other mechanism for receiving input from a user.

Figure 1B:
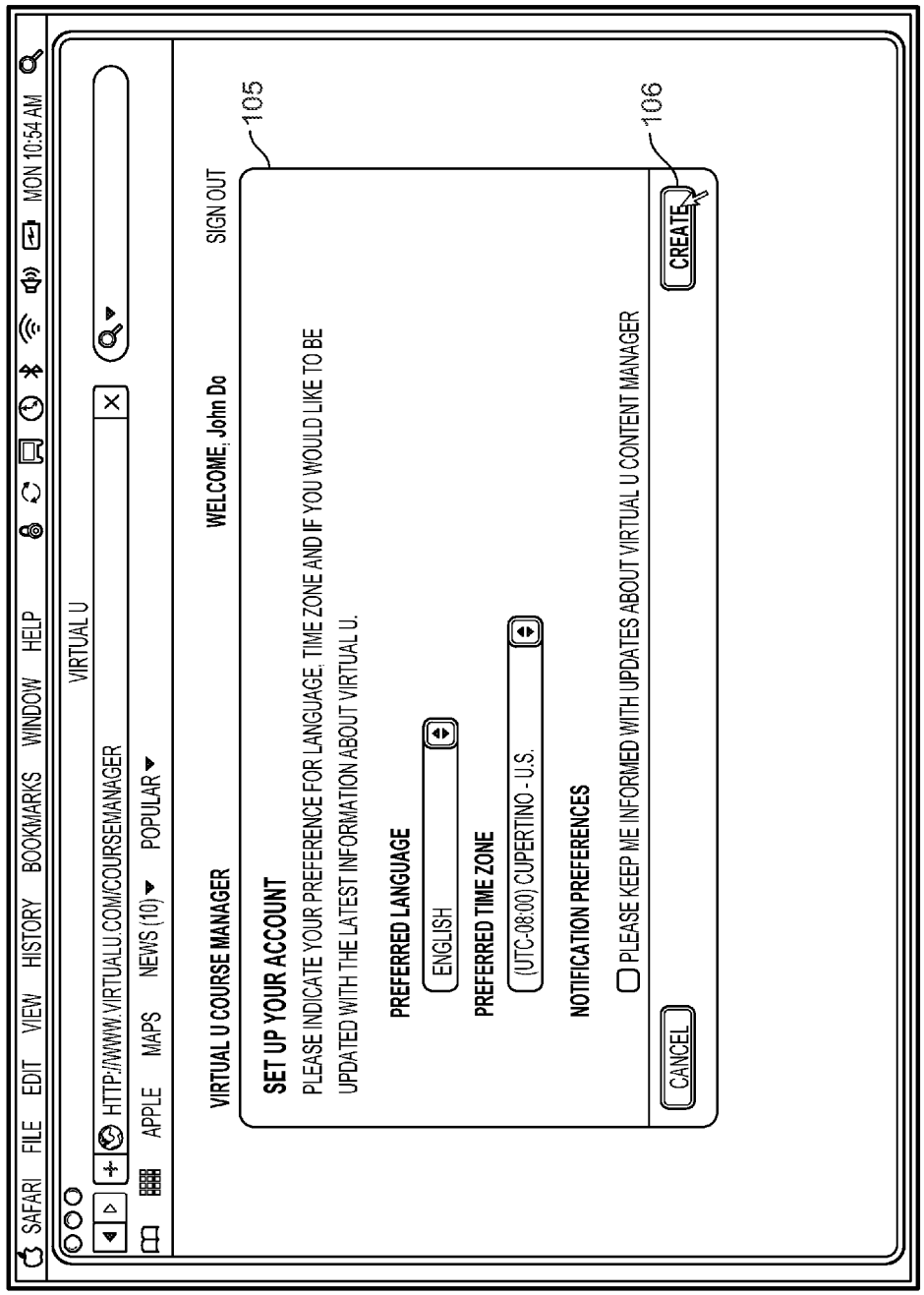
FIG. 1B illustrates an exemplary account setup page.

FIG. 1B illustrates an exemplary account setup window 105 for a network-enabled content authoring application. Window 105 can include user interface elements for allowing an instructor to set up a course manager account with a network-based course manager service (e.g., an online store, virtual university). For example, window 105 can include menus for selecting a preferred language for account (e.g., English), a preferred time zone (e.g., UTC-08:00, Cupertino—U.S.) and a check box that can be selected to receive updates to the course manager account or service. The course manager account can be created when the instructor clicks or touches "Create" button 106.

Figure 2:
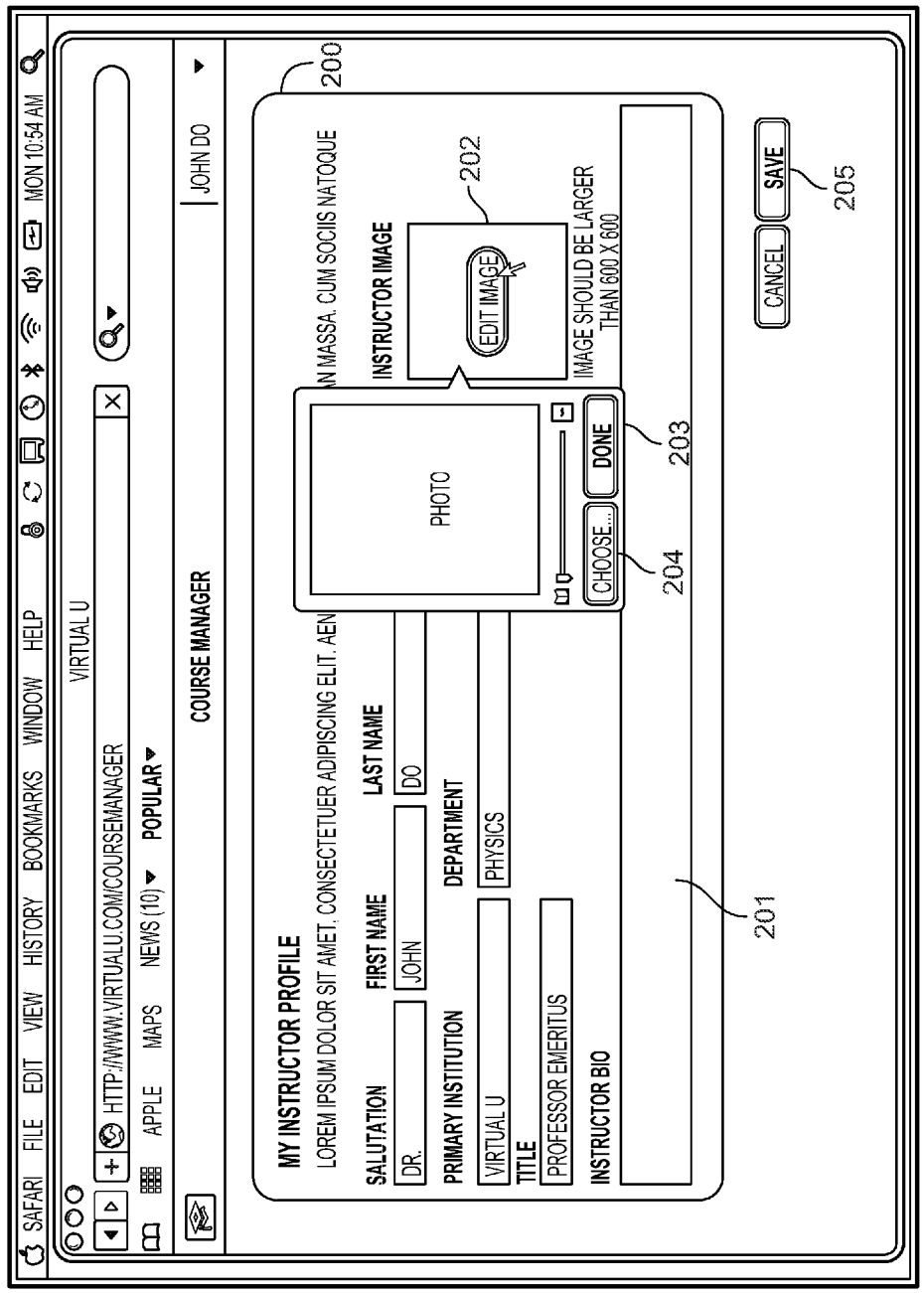
FIG. 2 illustrates an exemplary instructor profile setup page.

FIG. 2 illustrates an exemplary instructor profile window 200, which includes user interface elements for entering information about the instructor and a photo of the instructor. In the example shown, text boxes are provided for entering salutation, first name, last name, primary institution name, department name and title. Text box 201 allows an instructor to enter a biographical description. Image display area 202 is for displaying a digital photo of the instructor.

In some implementations, the instructor can select image display area 202 to invoke user interface element 203. User interface element 203 can include a slider control for changing the size of the image in image display area 202. User interface element 203 can include "Choose" button 204 to open a media browser to select a digital photo for display in image display area 202. The instructor can drag and drop a photo in the media browser into image display area 202. When the instructor has finished editing his profile, the instructor can select the "Save" button 205 to save the profile.

Figure 3A:
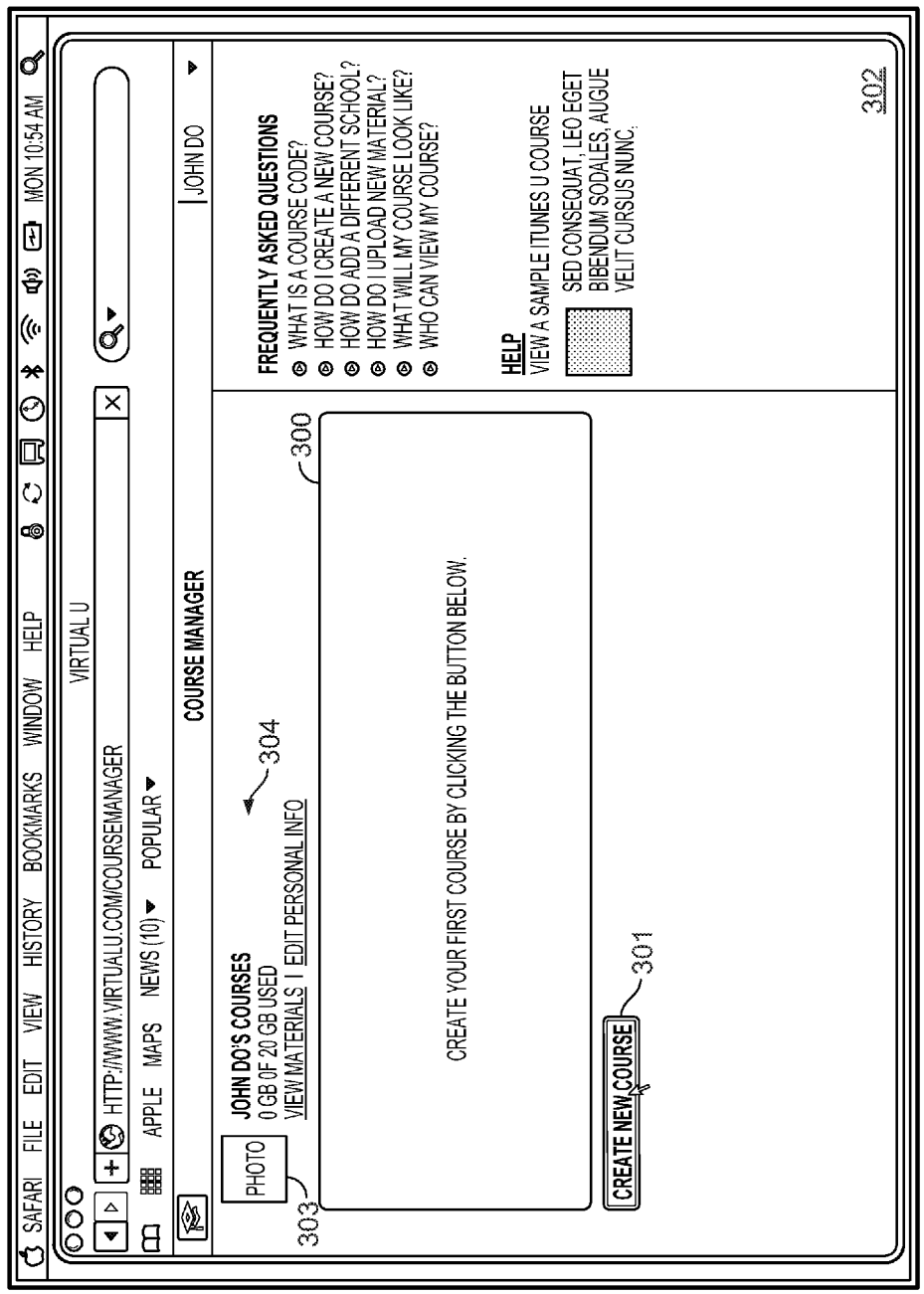
FIG. 3A illustrates an exemplary course manager page before a first course is created.

FIG. 3A illustrates an exemplary course manager page before a first course is created. The course manager page can include window 300 and "Create New Course" button 301. The instructor can create a first course by pressing button 301. Side bar 302 can display Frequently Asked Questions (FAQ), a help link and a user interface element that can be selected for viewing a sample course or template. The course manager page can also include photo 303 of the instructor and links 304 to view materials and edit personal information.

Figure 3B:
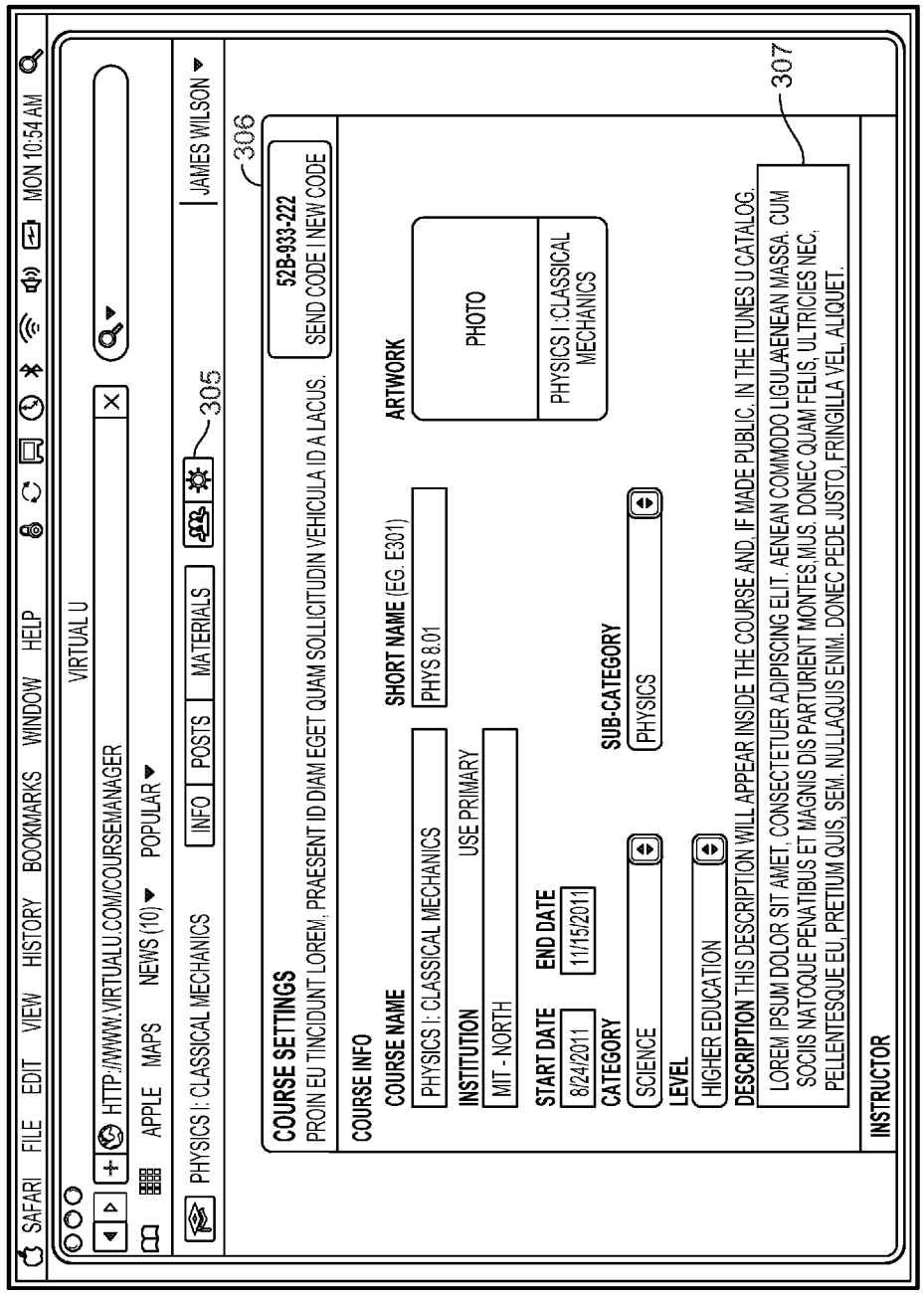
FIGS. 3B and 3C illustrate an exemplary course settings page.

FIG. 3B illustrates an exemplary course settings page. In some implementations, the settings page can be invoked by selecting user interface element 305 (e.g., a button). The settings page can include scrollable window 306 displaying various course settings. The course settings page includes a course information section including text boxes and menus for adding course information, such as a course long name, a course short name, institution name, start and end dates for the course, category (e.g., science), sub-category (e.g., physics) and educational level. A description of the course can be typed in text box 307.

Figure 3C:
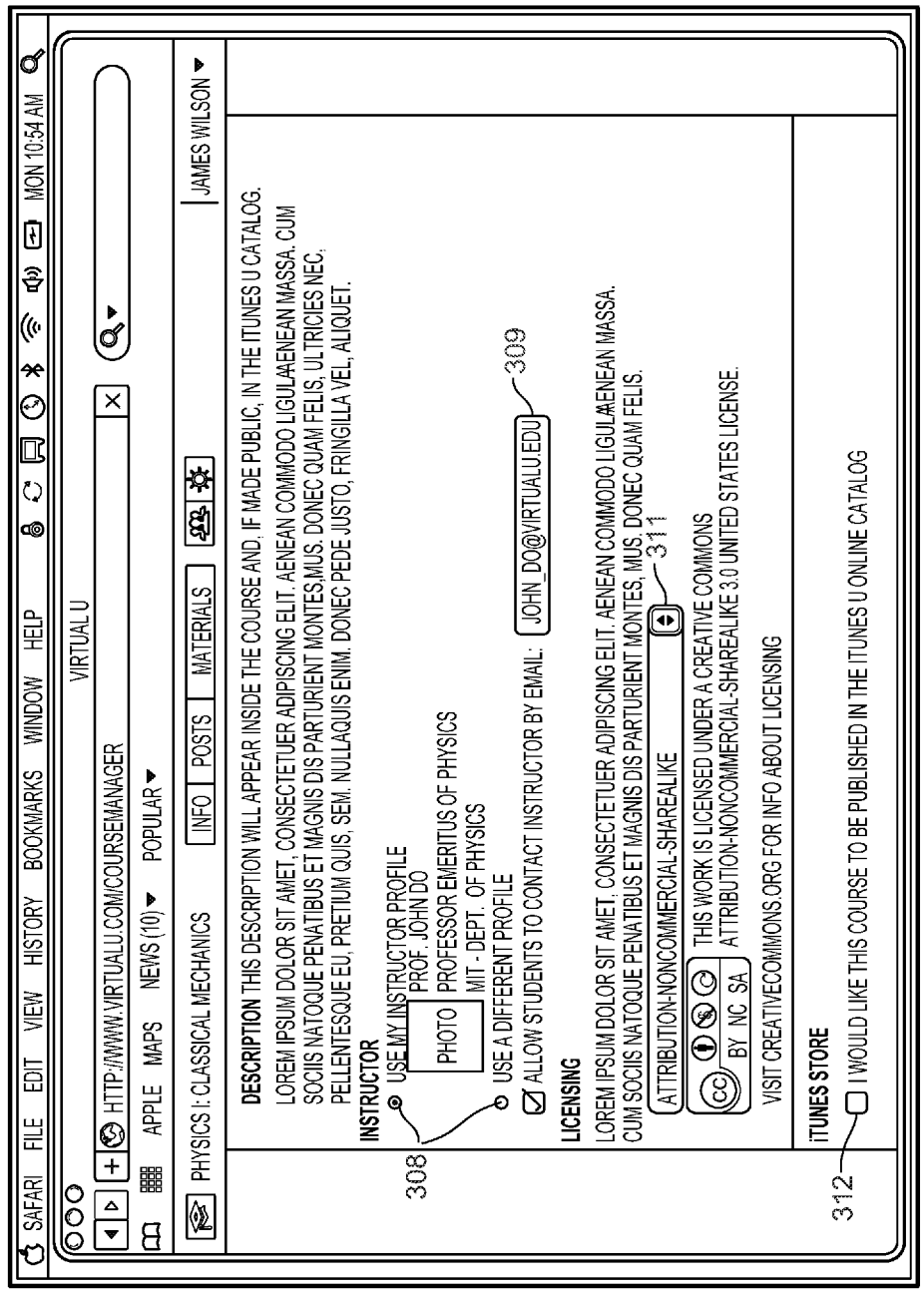

Referring to FIG. 3C, the course settings page can include an instructor information section that includes user interface elements 308 for allowing the instructor to select their profile created from the profile setup page (FIG. 2) or a different profile to be included in the course, and a check box and text box that allows students to contact the instructor by email. Text box 309 is where the instructor can type a contact email. Other user interface elements are also possible, such as a phone number to allow students to call or send text messages to the instructor. There can also be a link to the instructor's personal Web page, which may have additional information about the professor, and/or a link to a home page for a university where the professor is employed and/or to an online catalog of an online bookstore, etc.

A license information section in the course settings page can include user interface element 311 (e.g., a menu) to allow the instructor to select a Creative Commons license for sharing the course with other professors and students while maintaining a copyright on the course. Others can copy and distribute the course provided they give the instructor credit under the conditions of the license selected with user interface element 311.

An online store section in the course settings page includes user interface element 312 (e.g., a check box) that when checked allows the instructor to publish the course in an online catalog of an online store or virtual university.

Figure 3D:
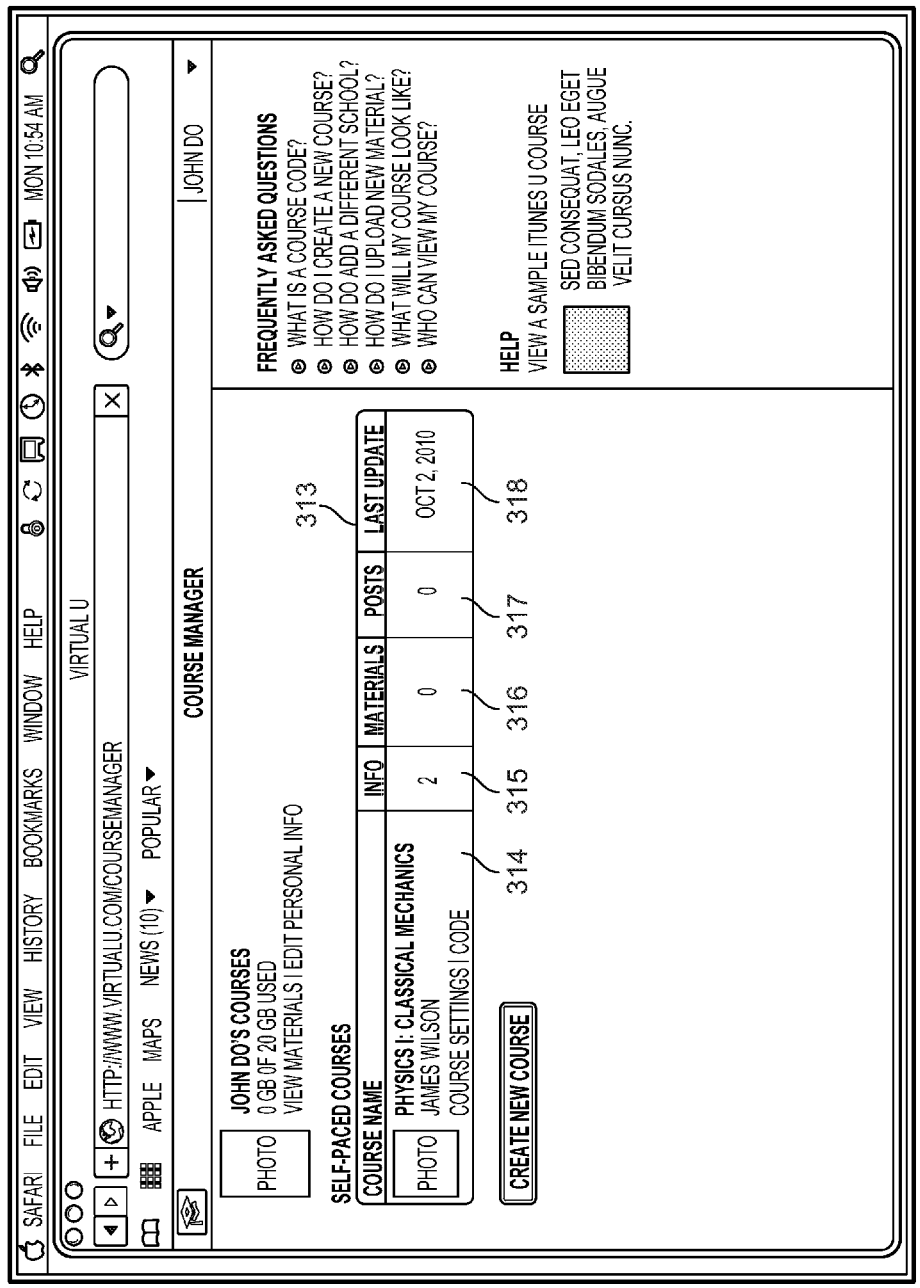
FIG. 3D illustrates an exemplary course manager page after the first course is created.

FIG. 3D illustrates an exemplary course manager page after the first course is created. The course manager page includes information pane 313 that includes a course name section 314, info section 315, materials section 316, posts section 317 and last update section 318. Name section 314 can include the course name, a thumbnail image and links to the course settings page and a course code. Last update section 318 displays the date the instructor last updated the course. Sections 315, 316, 317, display counts for information pages, posts and materials, respectively. These sections are described in further detail below.

Figure 4A:
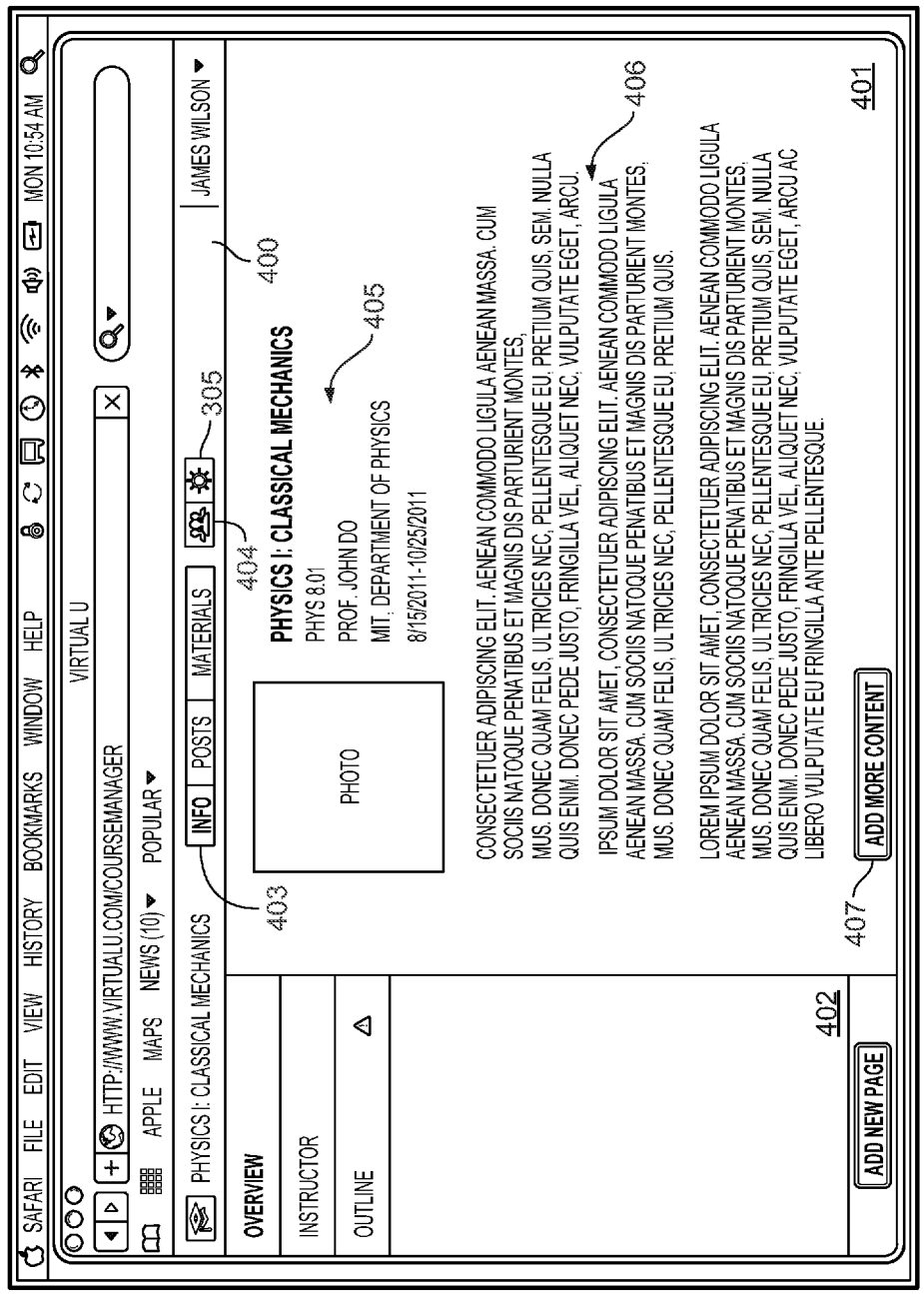
FIG. 4A illustrates an exemplary course information page.

FIG. 4A illustrates an exemplary course information page. The course information page includes navigation bar 400, content display area 401 and side bar 402. The topic "Overview" is currently selected in side bar 402.

Navigation bar 400 can include user interface element 403 (e.g., toggle button) for selecting between information, posts and materials pages of the course. In this example, the information option is currently selected, causing the "Overview" topic page to be displayed in content display area 401. Navigation bar 400 also includes user interface elements 305, 404 for displaying the course settings and student enrollment pages, respectively.

Content display area 401 can include course information area 405, content 406 and "Add More Content" button 407. Course information area 405 can display course information, including a thumbnail image and basic course information taken from the course settings page. Content 406 can be the actual course content (e.g., text, multimedia). The "Add More Content" button 407 can be used to add more content as described in reference to FIG. 4C.

Figure 4B:
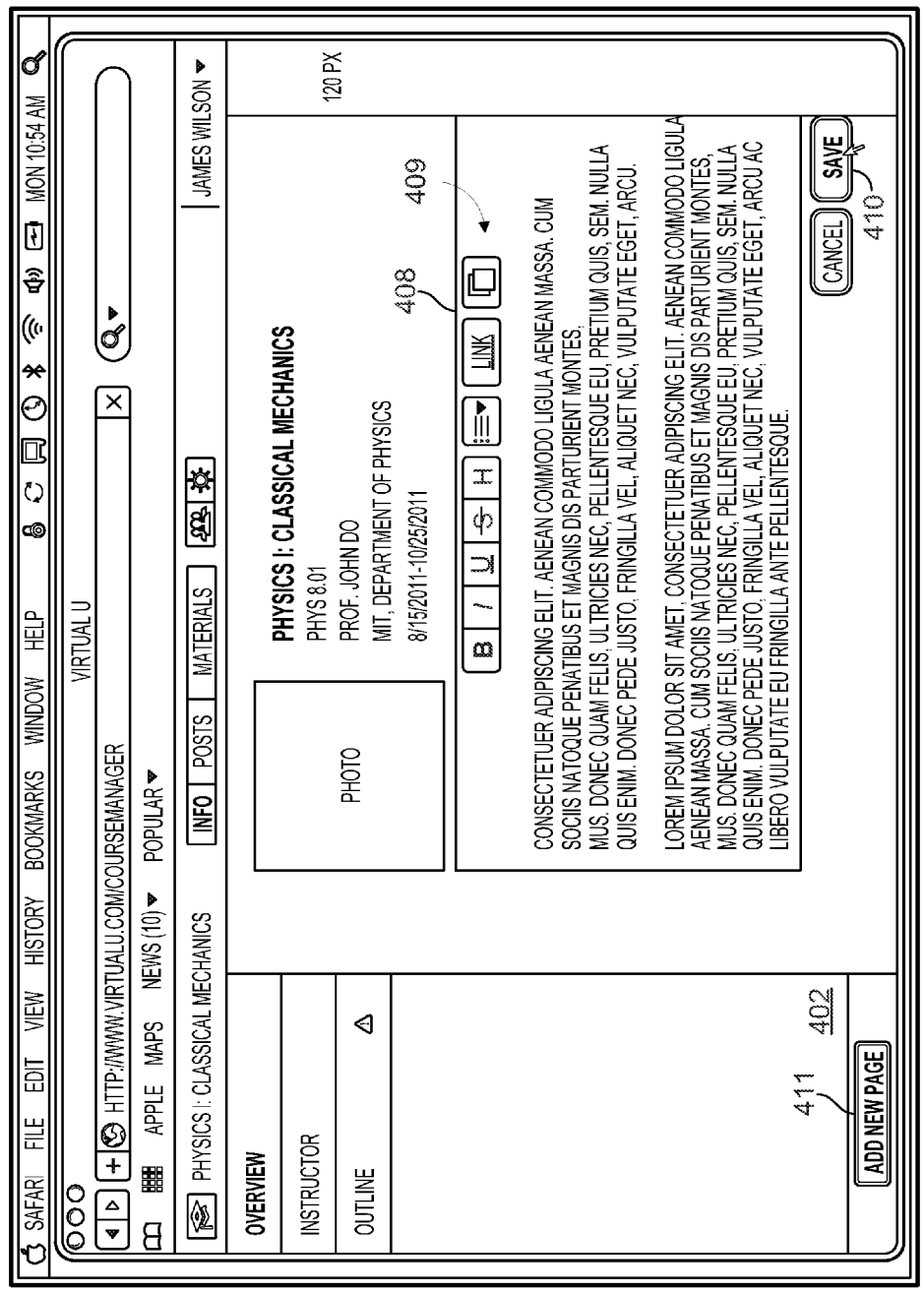
FIG. 4B illustrates editing content on the course information page.

FIG. 4B illustrates editing content on the course information page. If content 406 already exists and the instructor clicks on content 406, edit box 408 is displayed encompassing content 406. Edit box 408 includes tool bar 409, which includes buttons for selecting various editing tools, including but not limited to bold, italicize, underline, strikeout, paragraph format, etc. Additionally, toolbar 409 can provide buttons for adding links and media (e.g., digital images, video) to the "Overview" topic page. When finished editing, the instructor can press "Save" button 410 to save the "Overview" topic page.

Side bar 402 includes a list of topic descriptors. In this example, the topic descriptors include Overview, Instructor and Outline. The instructor can navigate to a topic page by selecting the topic descriptor corresponding to the topic page. An "Add New Page" button 411 can be pressed to add a new page to the course, as described in reference to FIG. 4D.

Figure 4C:
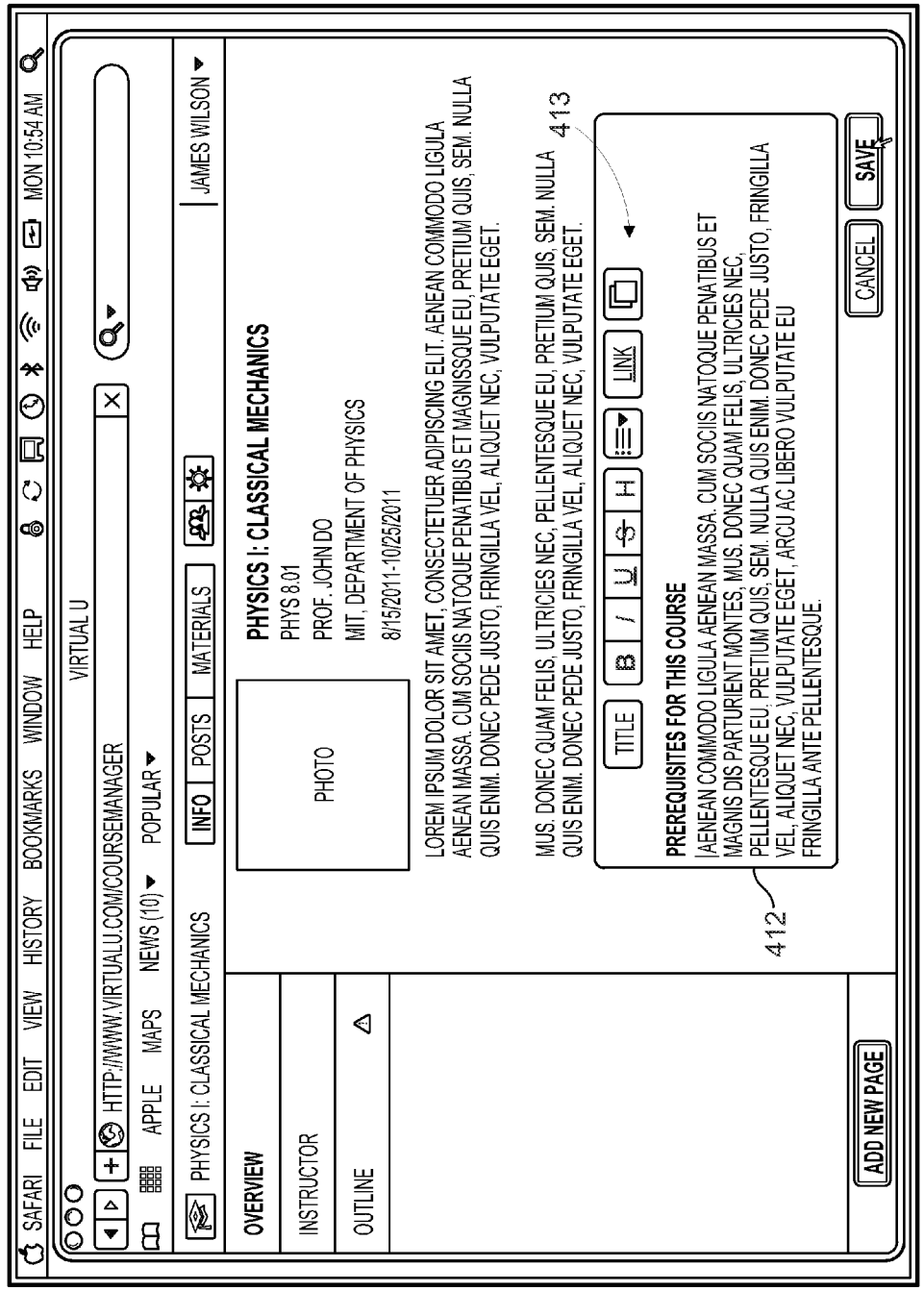
FIG. 4C illustrates adding new content to the course information page.

FIG. 4C illustrates adding content to the course information page. When the instructor presses "Add More Content" button 407 (FIG. 4A), edit box 412 is displayed to allow the instructor to add new content to the "Overview" page. Tool bar 413 of edit box 412 provides editing tools for adding the new content.

Figure 4D:
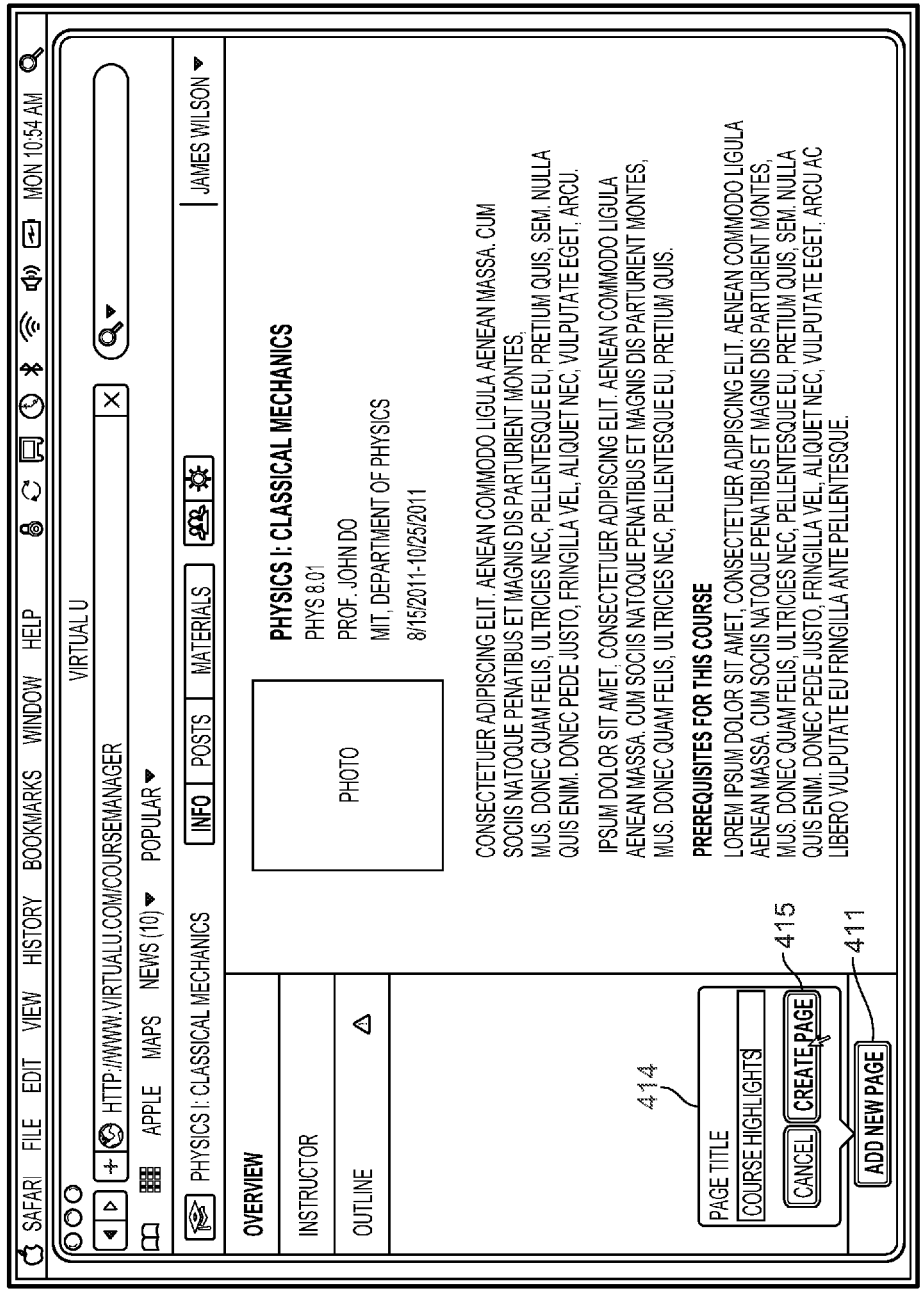
FIGS. 4D and 4E illustrate adding a new course information page.

FIG. 4D illustrates adding a new course information page. When the instructor presses the "Add New Page" button 411, dialog box 414 is displayed. Dialog box 414 includes a text field for allowing the instructor to type a page title. The instructor can press "Create Page" button 415 to create a new page called "Course Highlights," as shown in FIG. 4E.

Figure 4E:
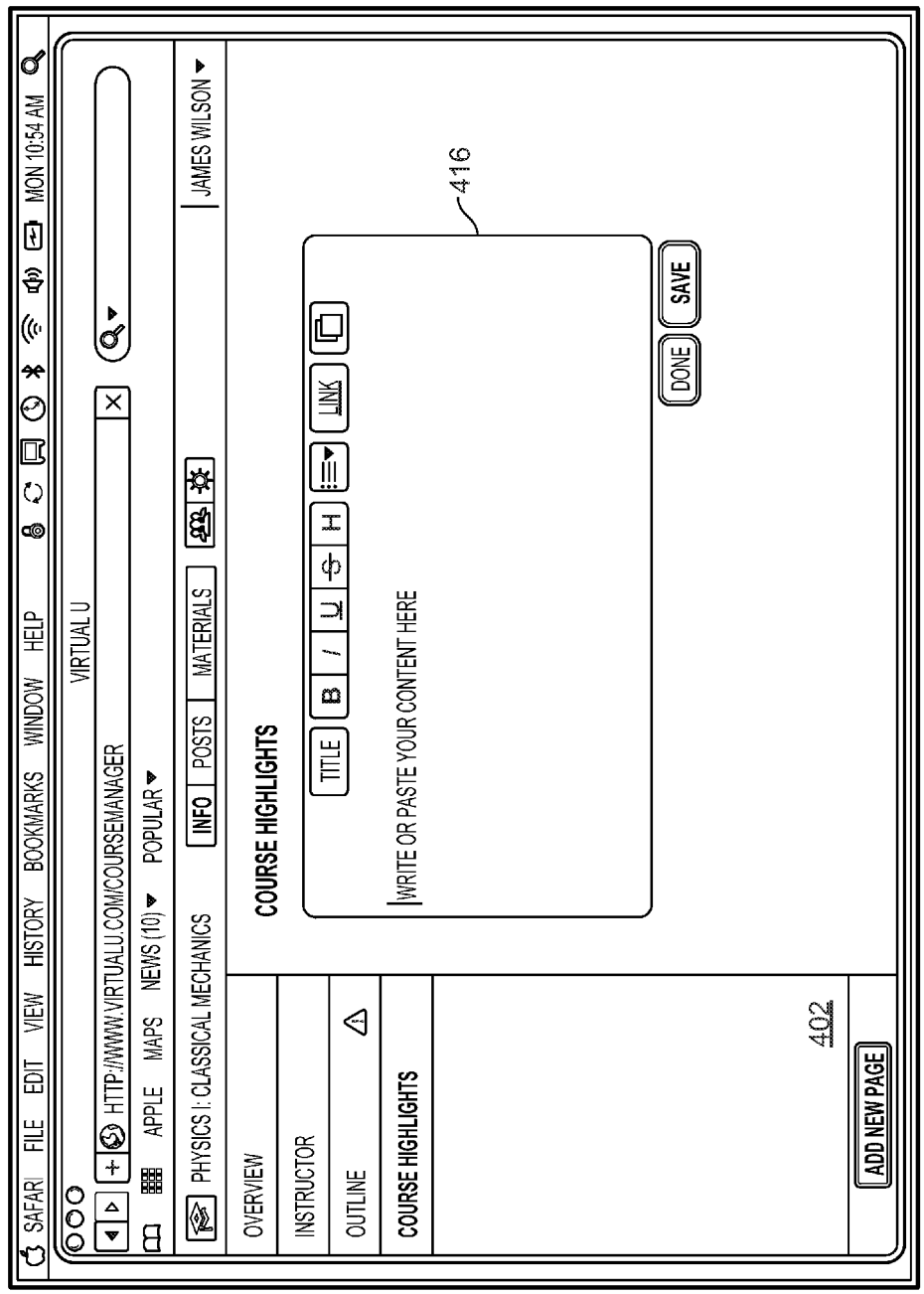

Referring to FIG. 4E, edit box 416 can be displayed to allow the instructor to start adding content. In some implementations on devices without a physical keyboard, a virtual keyboard can be displayed to facilitate the typing. A new topic descriptor for the new topic page "Course Highlights" is added to side bar 402.

Figure 5:
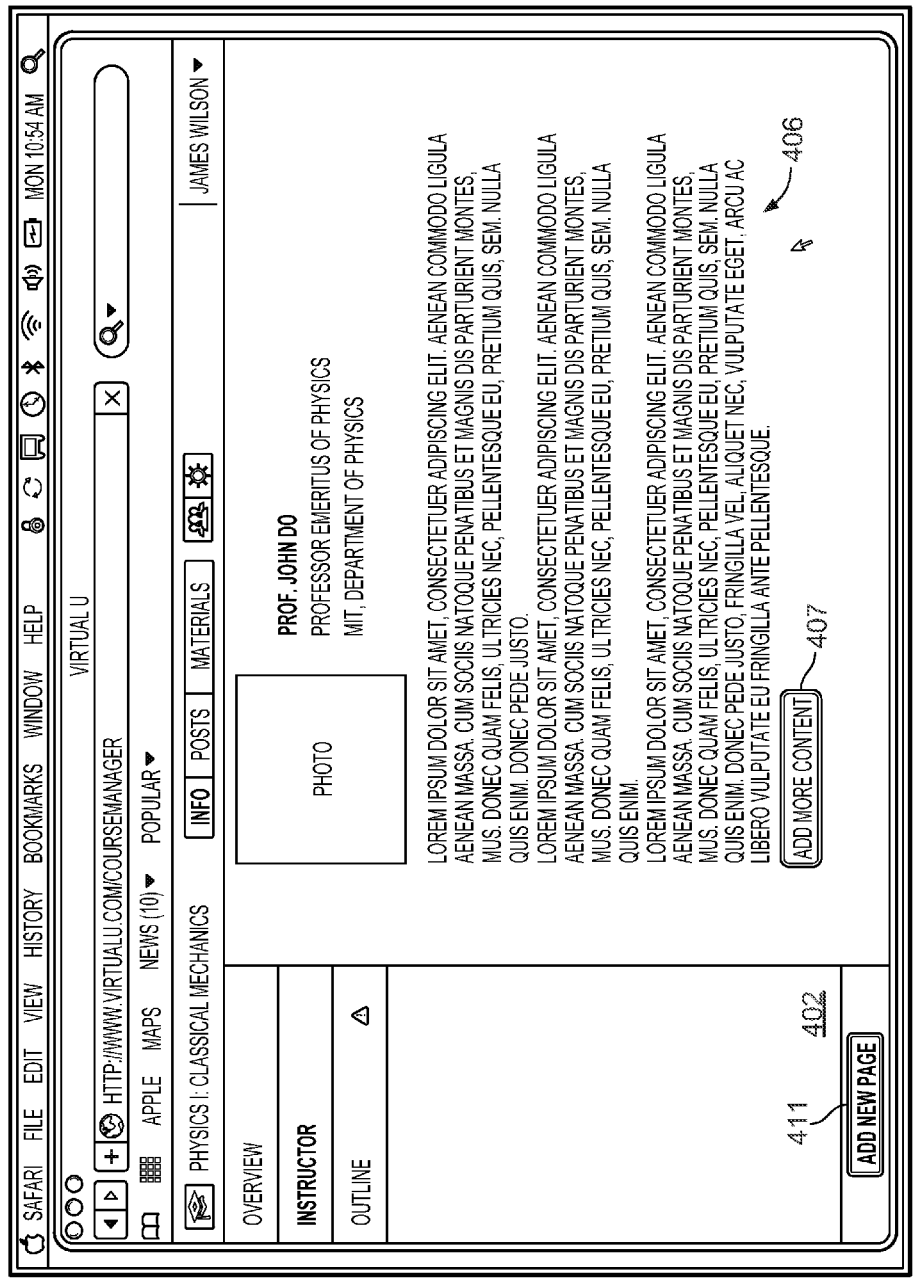
FIG. 5 illustrates an exemplary instructor information page.

FIG. 5 illustrates an exemplary instructor information page. The instructor information page can be selected from side bar 402 as can be indicated by a highlighted (e.g., bolded) descriptor for the instructor page. On this page, the instructor can edit or add personal information. When the instructor selects content 406 an edit box appears to allow editing of the content in a manner similar to that described in reference to FIG. 4B. Selecting the "Add More Content" button 407 opens an edit box to allow the instructor to add more content in a manner similar to that described in reference to FIG. 4D. "Add New Page" button 411 allows the instructor to add another page, as described in reference to FIG. 4D.

Figure 6:
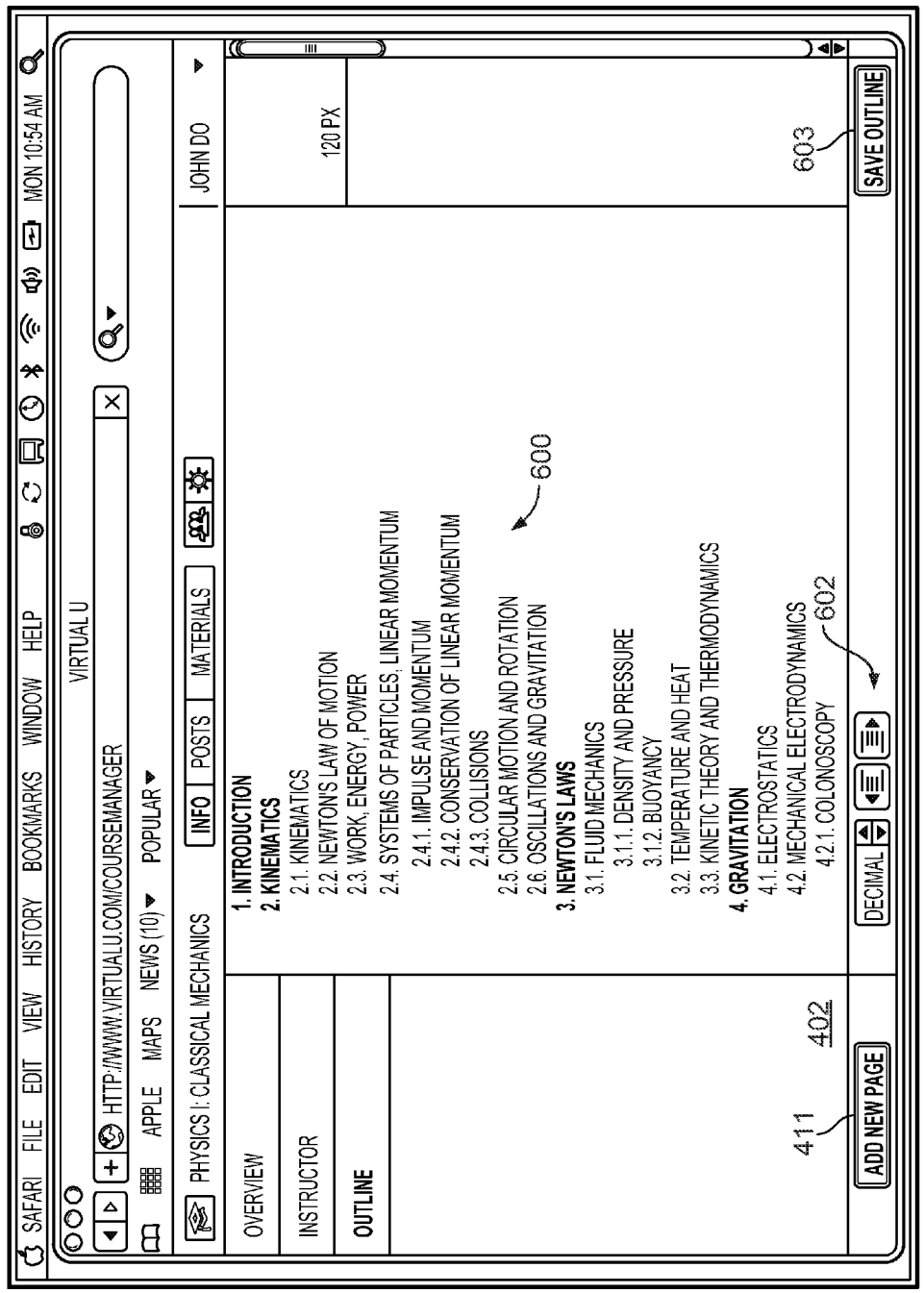
FIG. 6 illustrates an exemplary course outline page.

FIG. 6 illustrates an exemplary course outline page. The outline page was selected from side bar 402 as can be indicated by a highlighted descriptor for the outline page. On this page, the instructor can edit or add an outline for the course. Tool bar 602 provides access to editing tools that are useful for creating outlines, such as selecting a numbering format and paragraph shifting. "Add New Page" button 411 allows the instructor to add another page, as described in reference to FIG. 4D. "Save Outline" button 603 can be selected to save the outline.

Figure 7A:
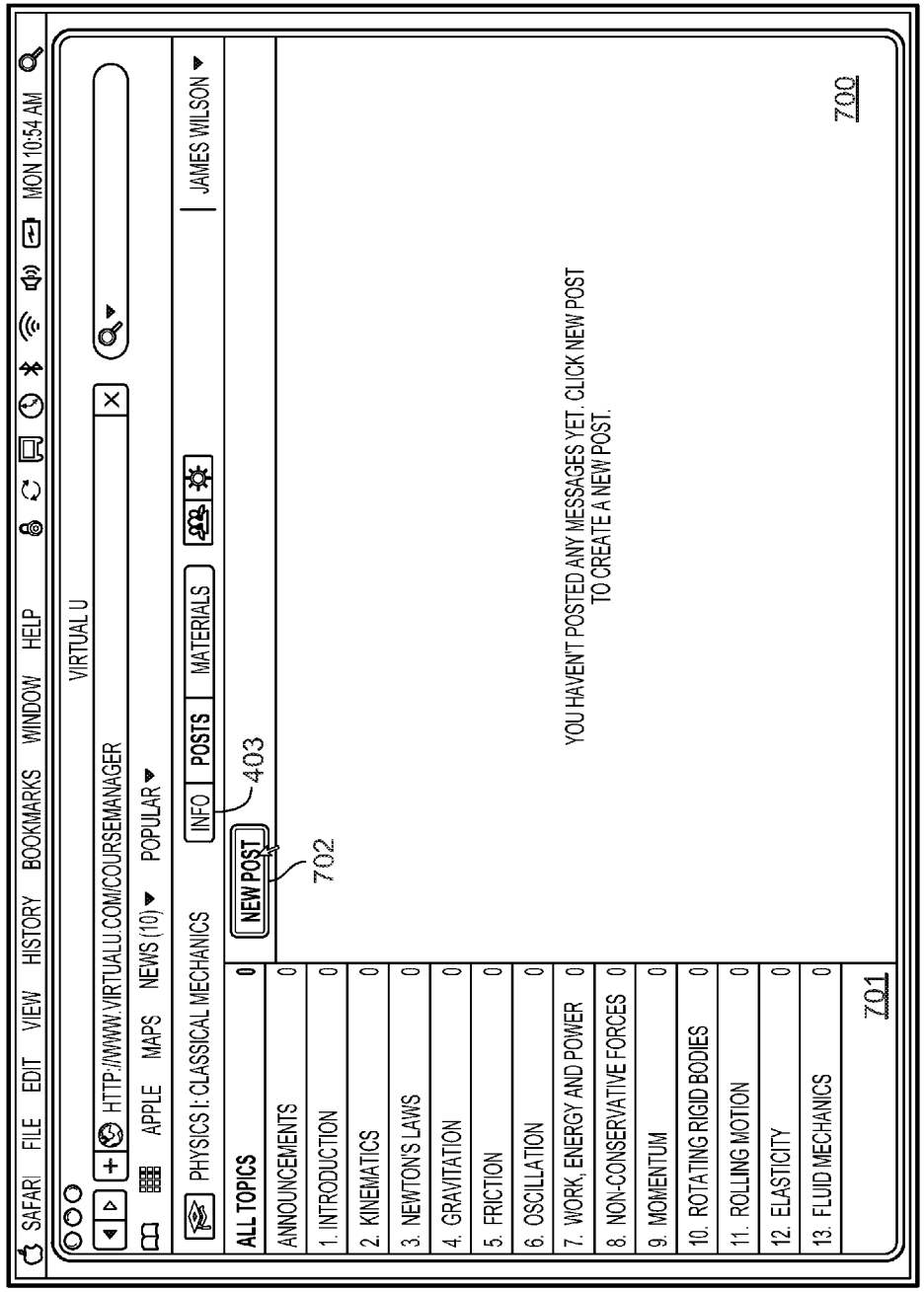
FIGS. 7A and 7B illustrate adding a new post to a post page.
Figure 7B:
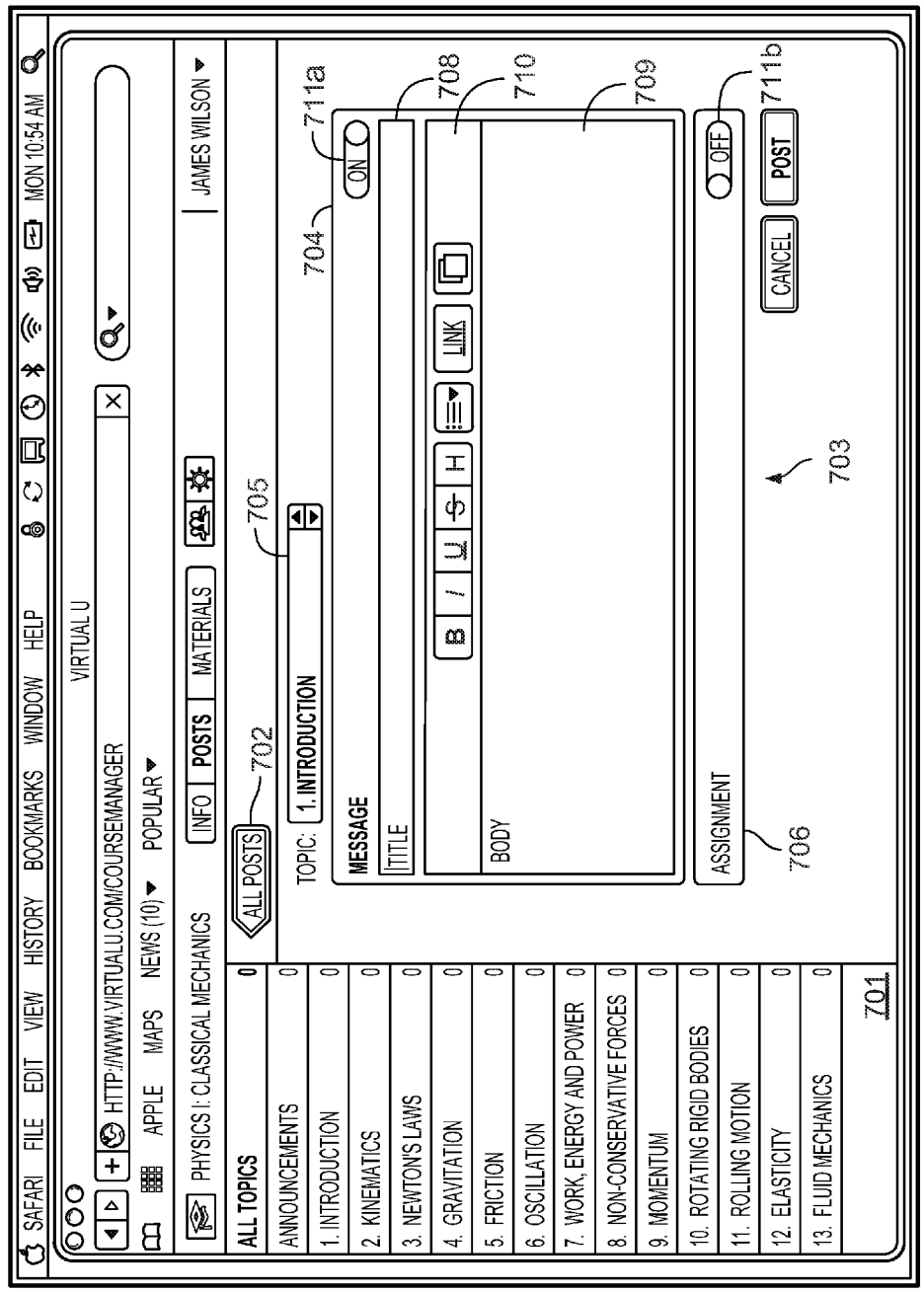

FIGS. 7A and 7B illustrate adding a new post to a post page. Referring to FIG. 7A, when the instructor presses the "posts" button of page selector 403, the posts page is displayed. The posts page includes post display area 700 and side bar 701. Side bar 701 lists descriptors for topics of the course. In this example, the "All Topics" button was pressed to display all posts for the course. Since no posts exist, post display area 700 is empty. The instructor can select the "New Post" button 702 to create a new post for the course.

Referring to FIG. 7B, in response to selecting New Post button 702, post user interface element 703 is displayed. In some implementations, posts user interface element 703 can be animated to "slide" onto the posts page from the right, left, top or bottom of the posts page. Post user interface element 703 can include edit box 704, topics selector 705 and assignment pane 706. In this mode, "New Post" button 702 changes to an "All Posts" button which when selected displays all posts for the course. Alternatively, posts for a particular topic selected in side bar 701 can be displayed.

Topics selector 705 (e.g., a menu) can be used to select a topic for the new post. Edit box 704 can include text field 708 for typing in a post title and body field 709 for typing in a post body. Tool bar 710 provides access to edit tools for editing text in body field 709. Switch 711a can be used to turn edit box 704 on or off. In this example, edit box 704 is turned on to allow the instructor to edit or add text.

Assignment pane 706 is used to add assignments to the course. Assignment pane includes switch 711b, which can be selected to turn on assignment pane 706 to allow the instructor to add an assignment to assignment to the course.

Figure 7C:
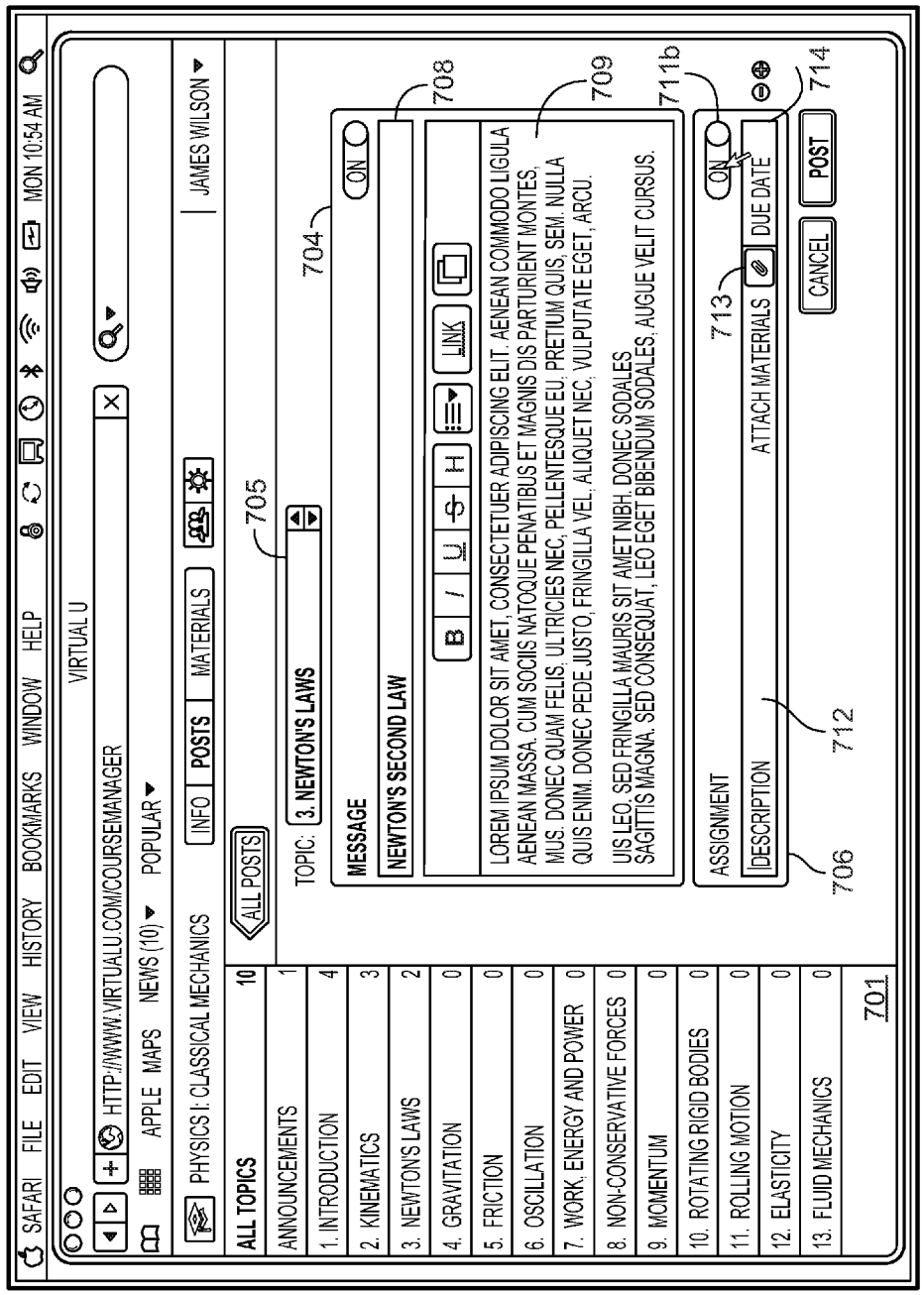
FIG. 7C illustrates adding a first assignment to the post.

FIG. 7C illustrates adding a first assignment to the post. In this example, assignment pane 706 is turned on, as indicated by switch 711b being in the "on" position. When assignment pane 706 is turned on, text field 712 is displayed for allowing the instructor to type in a description of the assignment. Due date field 714 allows the instructor to type an assignment due date. In some implementations, when due date field 714 is selected a mini calendar (not shown) can be displayed to allow the instructor to select a due date without typing. Attachment button 713 allows the instructor to attach materials to the assignment using a variety of methods, as described in reference to FIG. 7D.

Figure 7D:
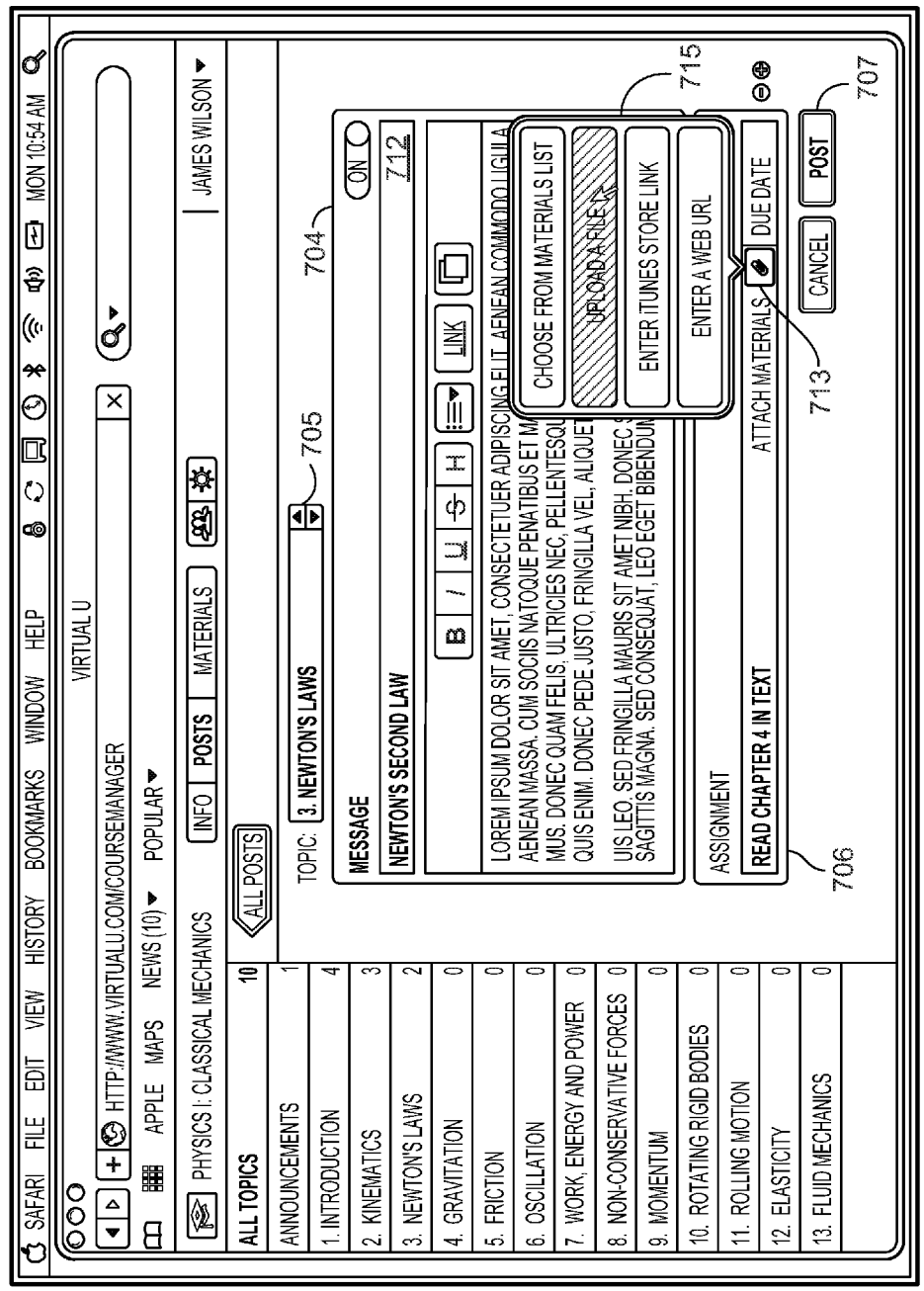
FIG. 7D illustrates attaching materials to the first assignment.

FIG. 7D illustrates attaching materials to the first assignment. In this example, the instructor has selected the topic "Newton's Second Law" using topic selector 705, and has typed text in edit box 704. The instructor has also added a description for the first assignment in text field 712.

In this example, the instructor is using button 713 to add materials to the first assignment. Upon pressing button 713, menu 715 is displayed, including descriptors for options for attaching materials. Some examples of options include but are not limited to: choosing from a materials list (see FIG. 8B), uploading a file from a computer, entering an online through a store link where the materials can be accessed or downloaded, entering a Web site Uniform Resource Locator (URL) containing the materials, etc. In this example, the instructor is uploading a textbook chapter from a computer, as can be indicated by highlighting the descriptor for uploading a file. The results of this uploading operation is shown in FIG. 7E.

Figure 7E:
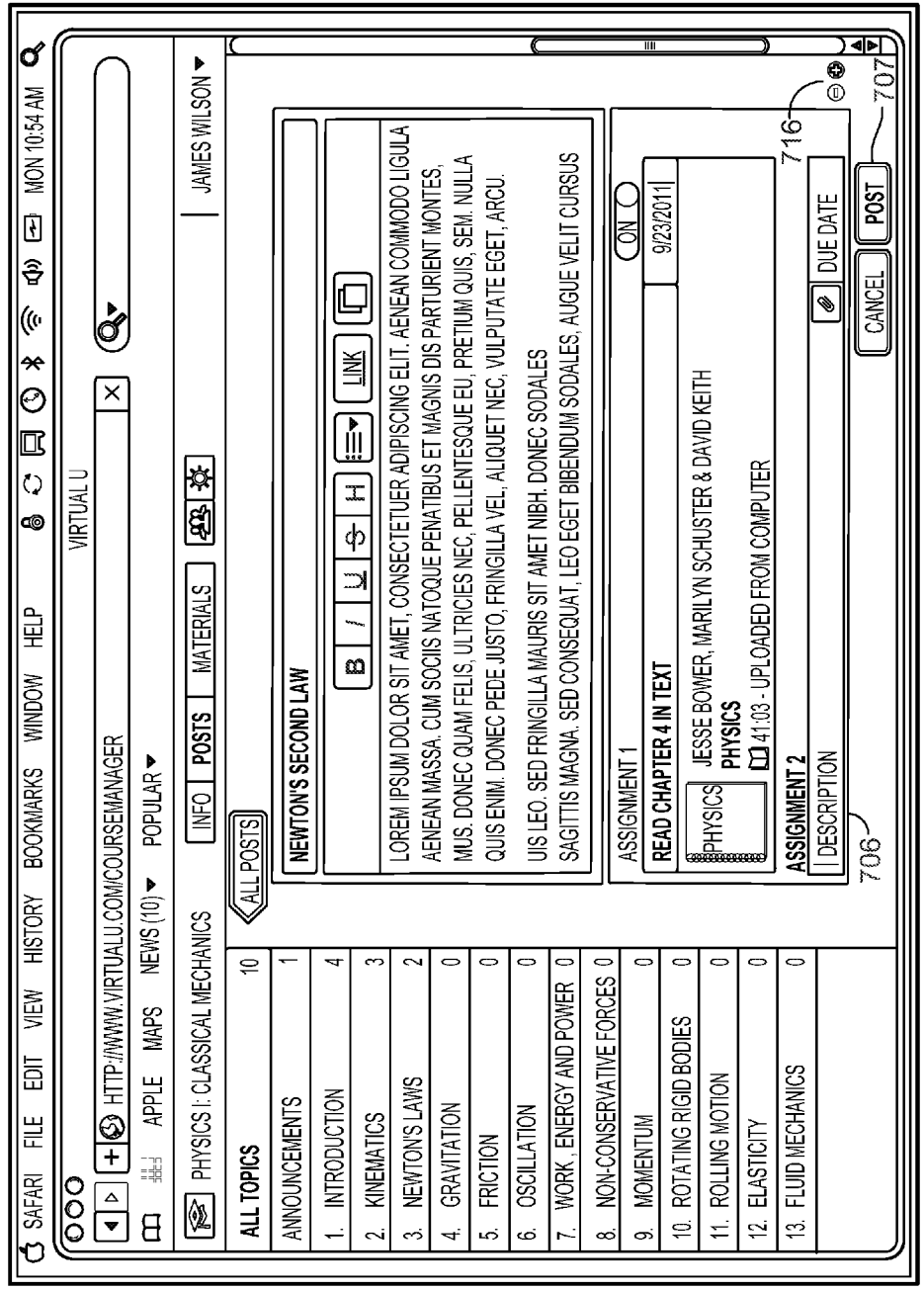
FIG. 7E illustrates adding a second assignment to the post.

FIG. 7E illustrates adding a second assignment to the post. In this example, the instructor added a second assignment to pane 706 using user interface elements 716. For example, the "+" button adds a second assignment to pane 706 and the "−" button can be used to remove an assignment from pane 706. When the instructor has finished with editing the post and/or adding assignments and materials, the instructor can press "Post" button 707 to publish the post, which automatically associates the post with the selected topic and adds the post to the course. The posts will be available to students and provide a mechanism for accessing assignments and materials for the course.

Figure 7F:
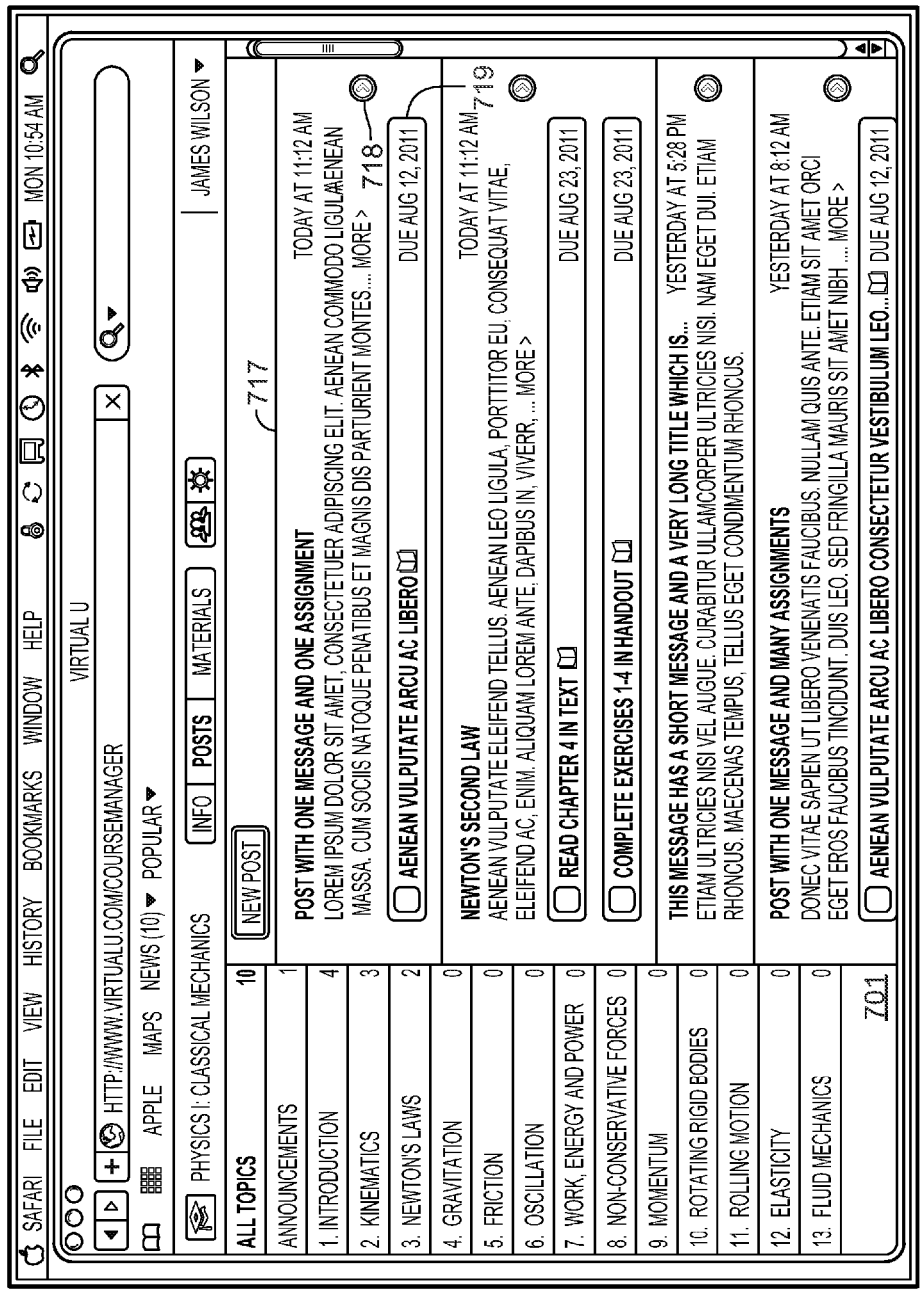
FIG. 7F illustrates a post page with all posts displayed.

FIG. 7F illustrates a post page with all posts displayed. In this example, posts are displayed in scrollable list 717 in chronological order. List 717 can be sorted, however, by any desirable sort criteria (e.g., alphabetical by title). Each post in list 717 can be delineated (e.g., visually delineated) from other posts in list 717 and can be acted upon by the instructor independent of other posts in list 717. For example, each post can be a row in list 717. In some implementations, each post can include a title and a snippet of text from the body of the post (e.g., the first x words). If there are assignments associated with the post, assignment descriptors 719 can be displayed with the post; one for each assignment. Assignment descriptors 719 can include a due date for the assignment, an indication of the type of assignment (e.g., a book icon to indicate a reading assignment) and an indication of whether materials have been attached to the assignment. The instructor can review the post body by selecting user interface element 718. The instructor can review the assignment by clicking on an assignment descriptor 719.

Side bar 701 displays a list of course topic descriptors. Each descriptor includes an indication of the number of posts for that topic. For example, "All Topics" has 10 posts, "Announcements" has 1 post, "Introduction" has 4 posts, "Kinematics" has 3 posts, "Newton's laws" has 2 posts and the rest of the topics have no posts.

Figure 8A:
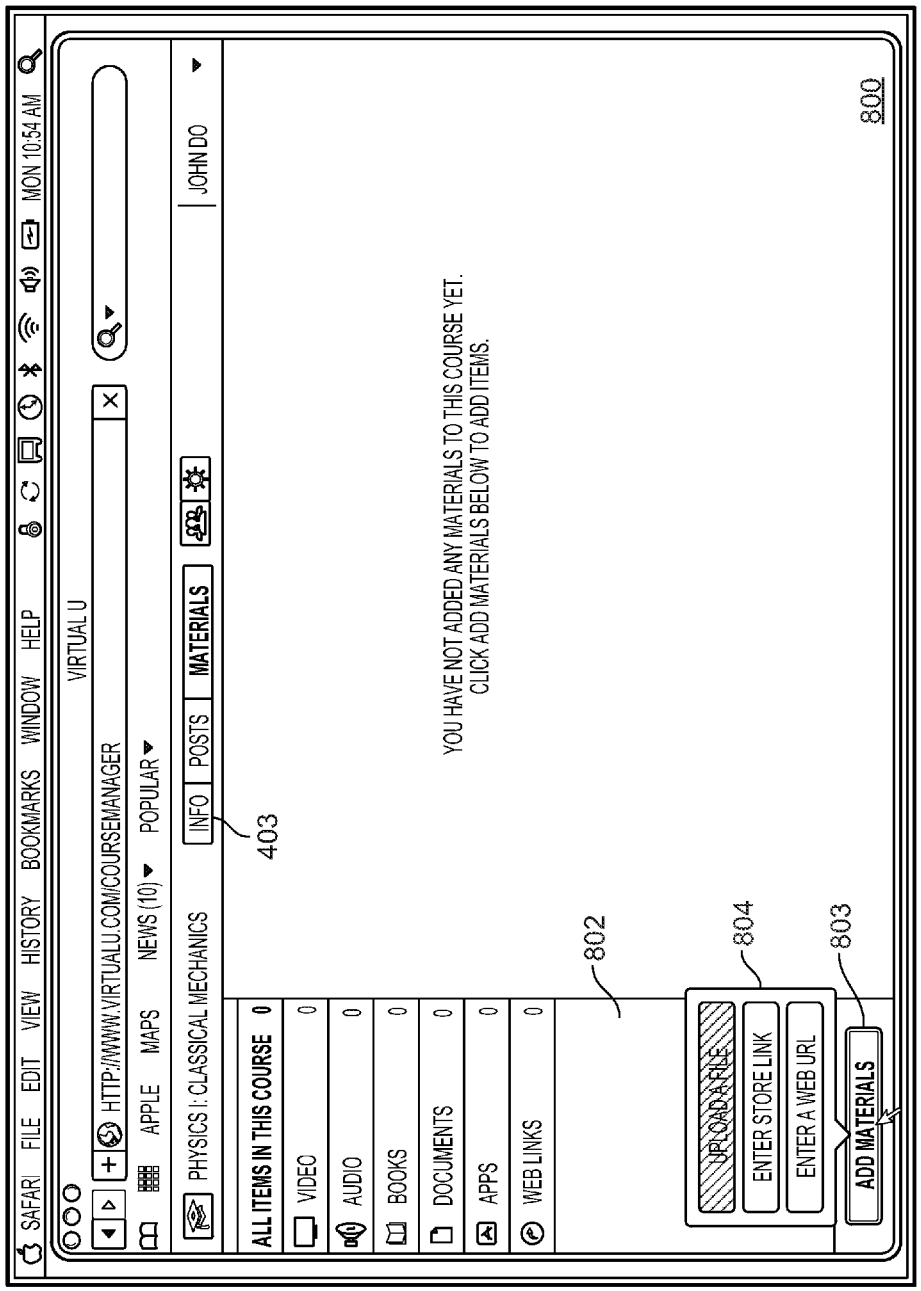
FIG. 8A illustrates adding materials to an exemplary materials page.

FIG. 8A illustrates adding materials to an exemplary materials page. In this example, the instructor has selected the "Materials" option from user interface element 403, resulting in content display area 800 and side bar 802 being displayed. Since no materials have been added to the course, display area 800 is empty. The instructor can add materials by selecting "Add Materials" button 803. Selecting button 803 displays menu 804. Menu 804 includes descriptors of options for adding materials to the course. Some examples of options include but are not limited to uploading a file, entering an online store through a link and entering a Web URL. In this example, the upload file option is selected as indicated by its descriptor being highlighted.

Figure 8B:
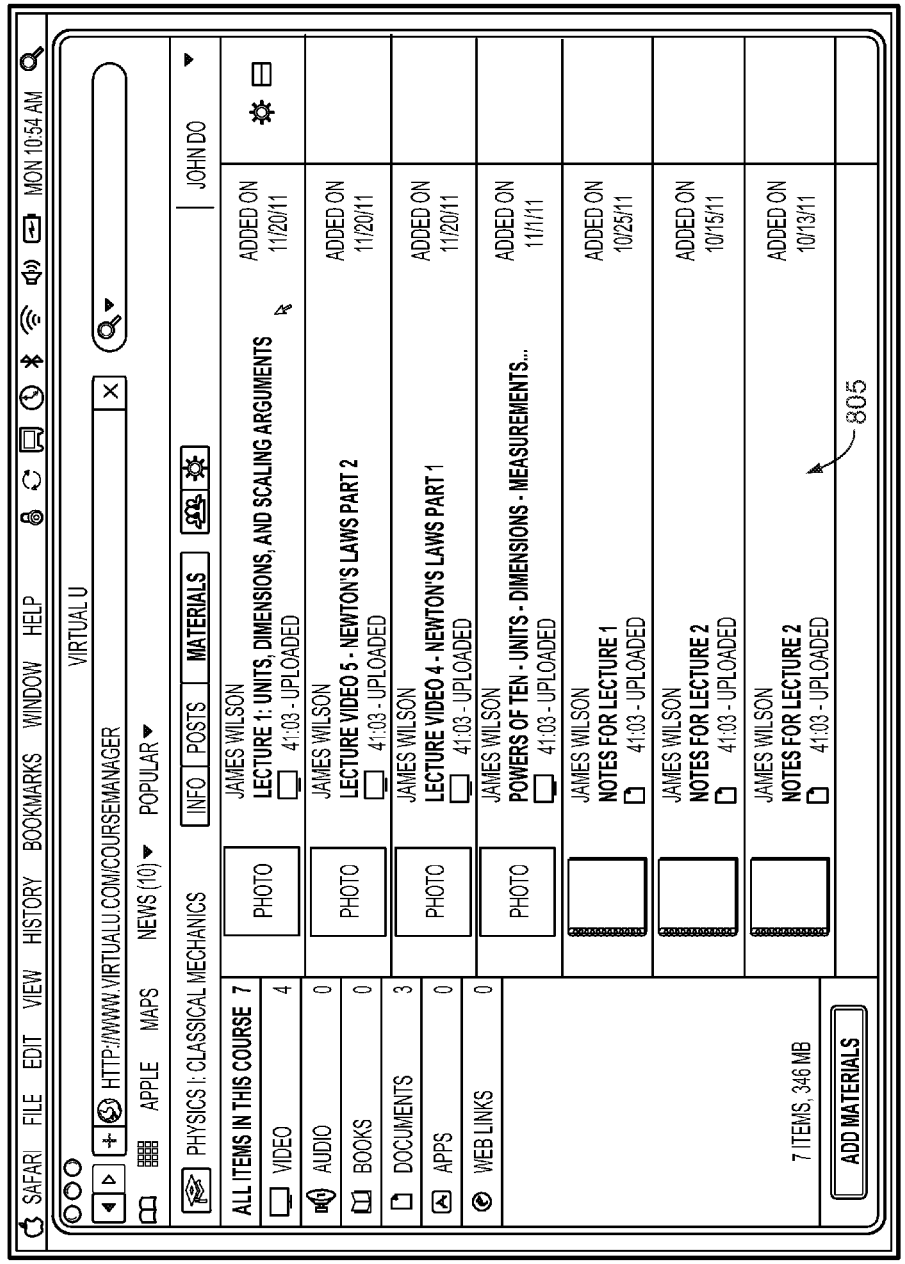
FIG. 8B illustrates the materials page with the added materials displayed in a list.

FIG. 8B illustrates the materials page with the added materials displayed in a scrollable list 805. Each row in list 805 can include a text description of a material type (e.g., document, video, audio, slideshow), an indication of the type of materials and the time date when the materials were added to the course. If the materials were uploaded, the time of upload can be displayed.

Figure 8C:
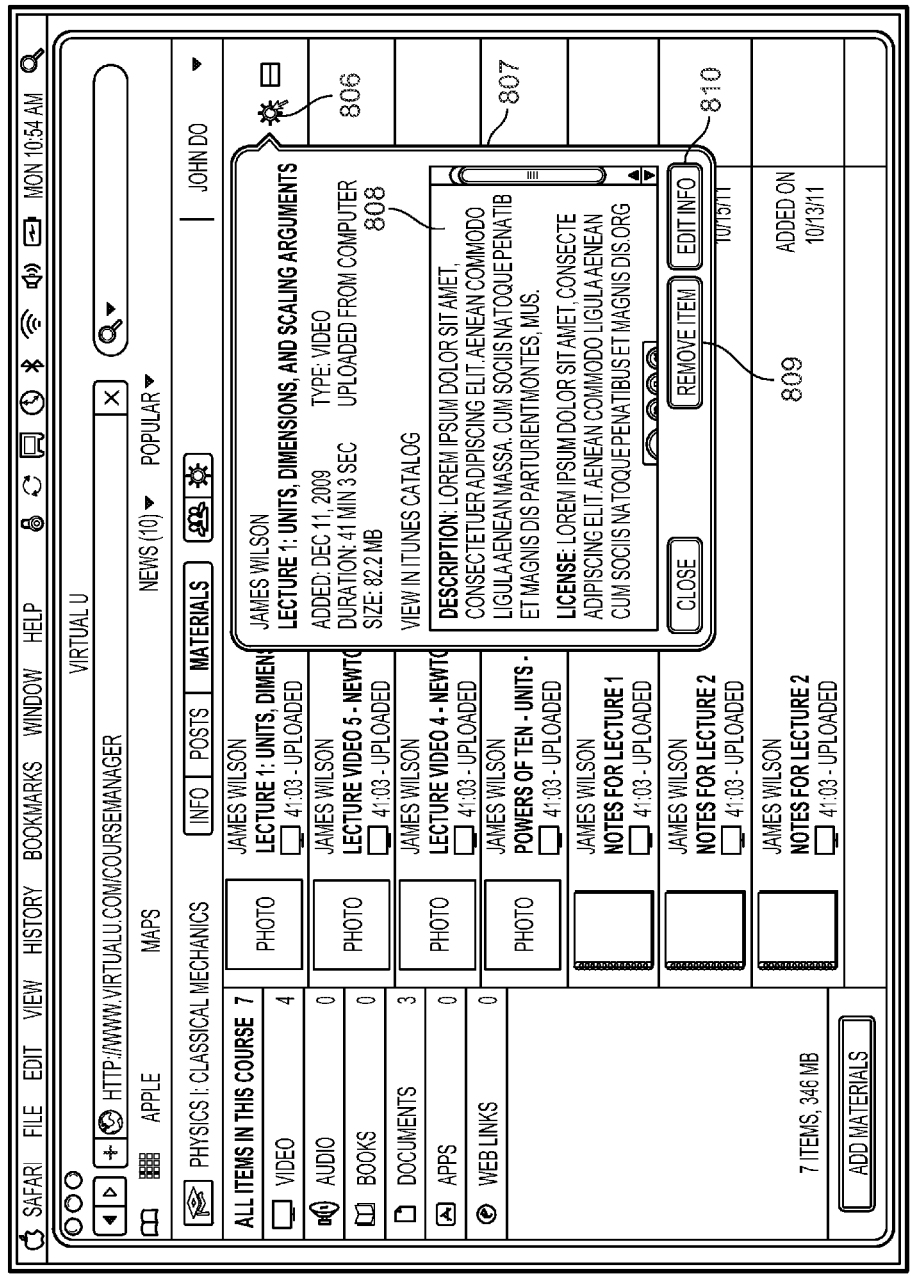
FIG. 8C illustrates editing metadata for the added materials displayed on the materials page.

FIG. 8C illustrates editing metadata for the added materials displayed on the materials page. When the instructor selects material settings button 806, dialog box 807 is displayed. Dialog box 807 includes description field 808, "Remove Item" button 809 and "Edit Info" button 810. The instructor can edit the description in description field 808 by selecting "Edit Info" button 810. The instructor can remove an item by selecting the "Remove Item" button 809.

Figure 9A:
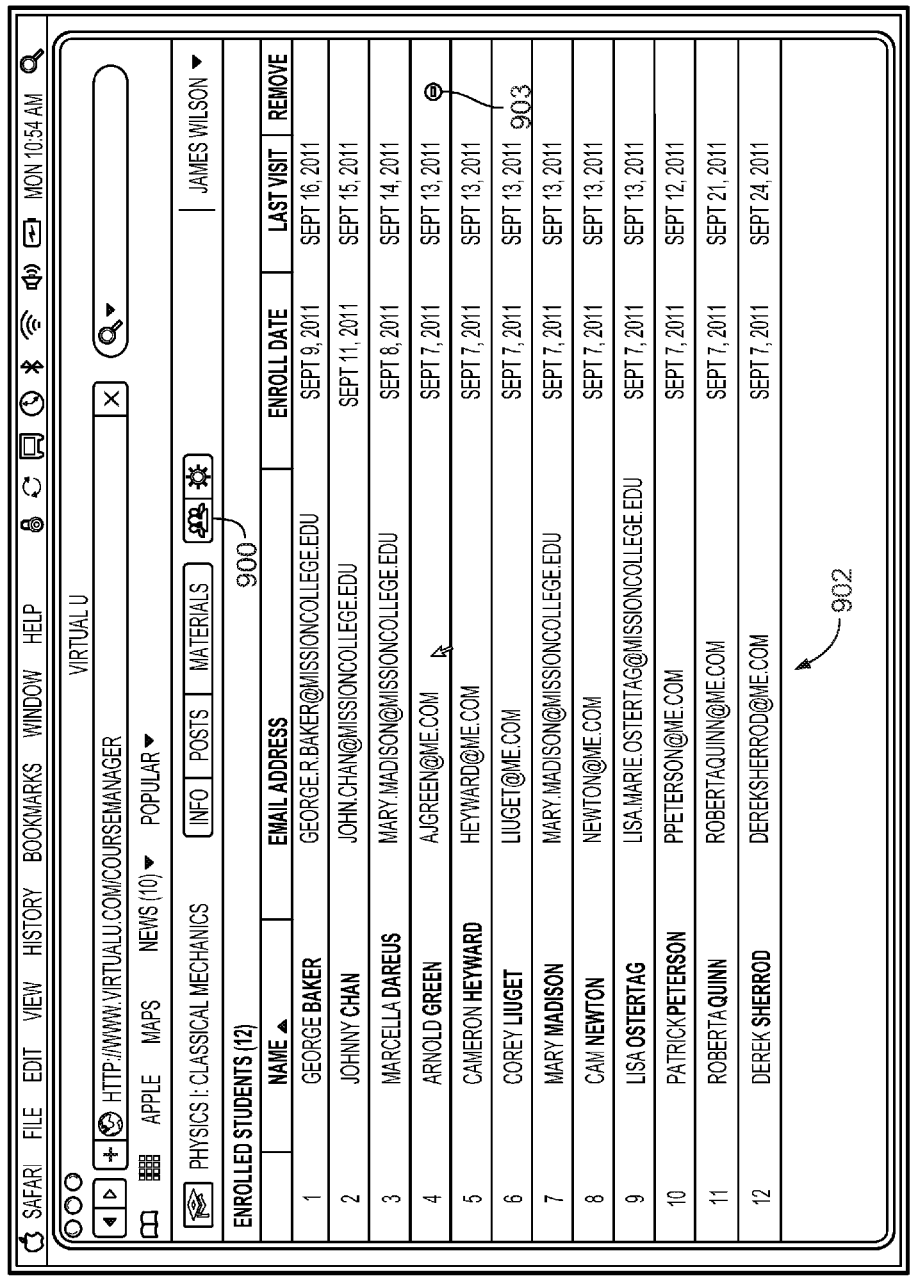
FIG. 9A illustrates a student enrollment page.

FIG. 9A illustrates a student enrollment page. In this example, when the instructor selects user interface element 900, scrollable list 902 of enrolled students is displayed. Each row in list 902 corresponds to a student and can include information about the student, including but not limited to the student's first and last name, email address, enrollment date, and the date of student's last visit online. The students can be sorted in list 902 alphabetically according to their last name or any other desired sorting criteria. User interface element 903 can be included for each student. The instructor can select user interface element 903 to remove the student corresponding to the element 903 from the course.

FIG. 9B illustrates removing a student from the student enrollment page. In this example, Arnold Green was removed when the instructor selected user interface element 903. List 902 can be divided into two sections: a first section for listing enrolled students and a second section for listing removed students. Arnold Green is now displayed in the removed section.

The simple and intuitive GUIs described in reference to FIGS. 1-9 above provide instructors with better manual control to create and edit a course, as well as providing the instructor with better visual feedback during the creation and editing processes. The GUIs provide instructors with easy to use mechanisms for adding and editing course assignments and attaching course materials.

Exemplary Content Authoring Process

Figure 10:
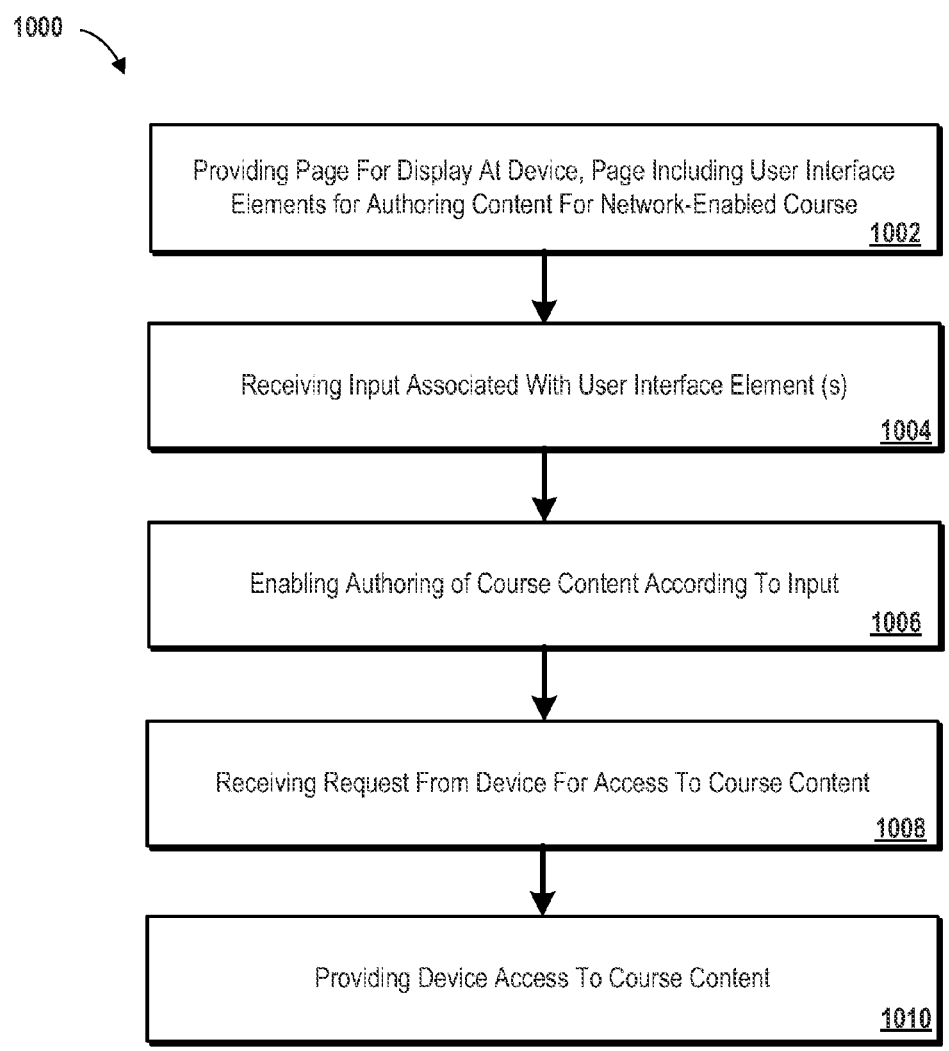
FIG. 10 illustrates an exemplary content authoring process.

FIG. 10 illustrates an exemplary content authoring process 1000. In some implementations, process 1000 can be implemented using the architecture described in reference to FIG. 13.

In some implementations, process 1000 can begin by providing a page for display at a device (1002). The page (e.g., a Web page) can be part of an "in-session" education course or a "self-paced" education course. An "in-session" course can be a private, calendar driven course, where the student can receive live updates from the instructor. A "self-paced" course can be a public and self-contained course with an outline, structured posts and materials. The page can be a Web page provided by a server computer over a network (e.g., Internet, intranet, wireless network), as described in reference to FIG. 11. The Web page can be displayed in a window generated by an application (e.g., a browser application) running on a client device operated by the student. The page can include user interface elements for creating or editing a course, as described in reference to FIGS. 1-9. A first user interface element can be configured for authoring a post related the course, and a second user interface element can be configured for adding an assignment to the post and for adding materials to the assignment.

Process 1000 can continue by receiving input associated with one or more user interface elements (1004). The input can be provided by a user (e.g., an instructor) and the user interface elements can be buttons, menus and the like.

Process 1000 can continue by enabling authoring of the course content according to the input (1006). For example, the instructor can edit existing content or create new content, such as text, digital images, video, slide shows and the like. The instruction can edit and create and add assignments to courses and attach materials to assignments using a variety of methods (e.g., upload, links, URLs), such as uploading files to an online store or virtual university, as described in reference to FIG. 11.

Process 1000 can continue by receiving a request from a device for access to the course content (1008). For example, the request can come from a client device operated by a student enrolled in the course.

Process 1000 can continue by providing the device access to the course content (1010). For example, the content can be downloaded or streamed to the device.

Exemplary Operating Environment

Figure 11:
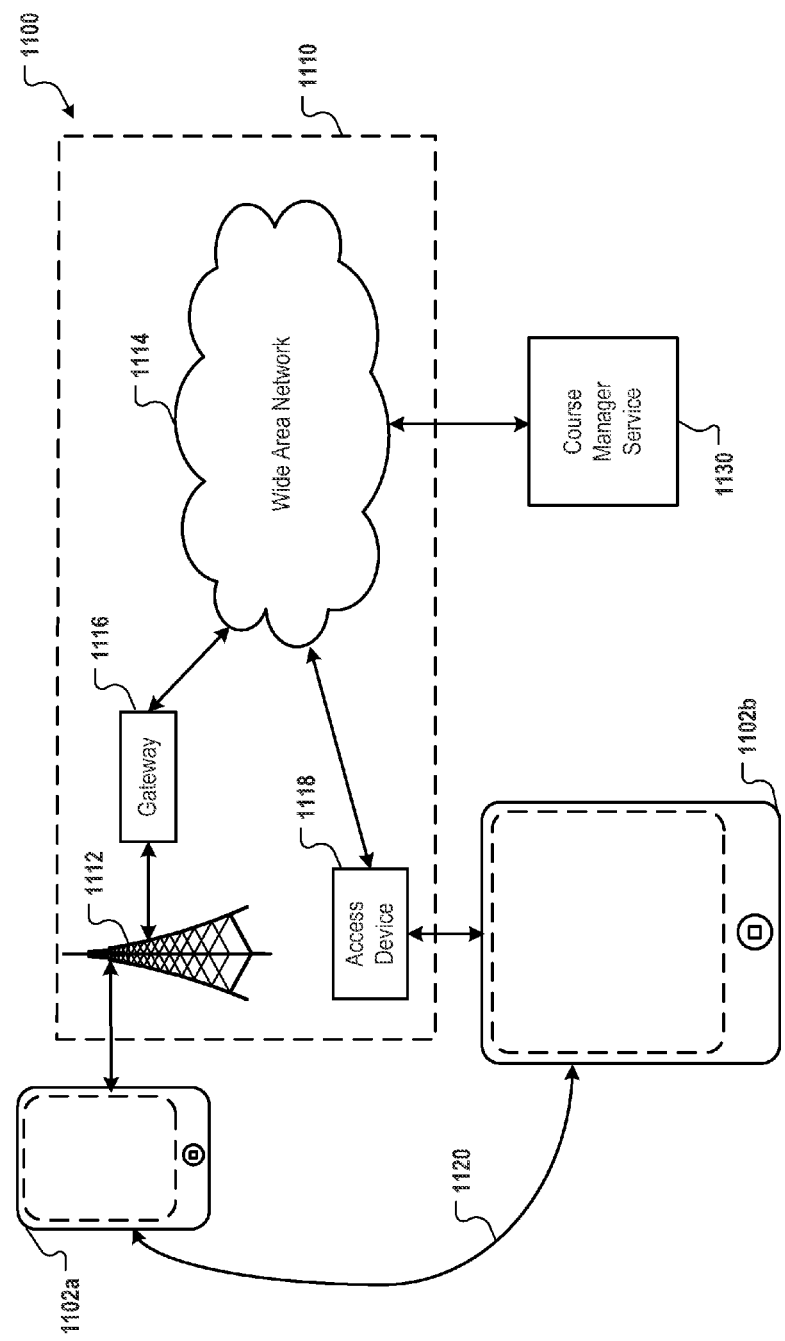
FIG. 11 is a block diagram of an exemplary operating environment for a device capable of running a network-enabled content authoring application.

FIG. 11 is a block diagram of an exemplary operating environment for a device capable of running a network-enabled content authoring application. In some implementations, devices 1102a and 1102b can communicate over one or more wired or wireless networks 1110. For example, wireless network 1112 (e.g., a cellular network) can communicate with a wide area network (WAN) 1114 (e.g., the Internet) by use of gateway 1116. Likewise, access device 1118 (e.g., IEEE 802.11g wireless access device) can provide communication access to WAN 1114. Devices 1102a, 1102b can be any device capable of displaying GUIs of the disclosed content authoring application, including but not limited to portable computers, smart phones and electronic tablets. In some implementations, the devices 1102a, 1102b do not have to be portable but can be a desktop computer, television system, kiosk system or the like.

In some implementations, both voice and data communications can be established over wireless network 1112 and access device 1118. For example, device 1102a can place and receive phone calls (e.g., using voice over Internet Protocol (VoIP) protocols), send and receive e-mail messages (e.g., using SMPTP or Post Office Protocol 3 (POP3)), and retrieve electronic documents and/or streams, such as web pages, photographs, and videos, over wireless network 1112, gateway 1116, and WAN 1114 (e.g., using Transmission Control Protocol/Internet Protocol (TCP/IP) or User Datagram Protocol (UDP)). Likewise, in some implementations, device 1102b can place and receive phone calls, send and receive e-mail messages, and retrieve electronic documents over access device 1118 and WAN 1114. In some implementations, device 1102a or 1102b can be physically connected to access device 1118 using one or more cables and access device 1118 can be a personal computer. In this configuration, device 1102a or 1102b can be referred to as a "tethered" device.

Devices 1102a and 1102b can also establish communications by other means. For example, wireless device 1102a can communicate with other wireless devices (e.g., other devices 1102a or 1102b, cell phones) over the wireless network 1112. Likewise, devices 1102a and 1102b can establish peer-to-peer communications 1120 (e.g., a personal area network) by use of one or more communication subsystems, such as the Bluetooth™ communication devices. Other communication protocols and topologies can also be implemented.

Devices 1102a or 1102b can communicate with service 1130 over the one or more wired and/or wireless networks 1110. For example, service 1130 can be an online store or university that provides Web pages to client devices that include the features described in reference to FIGS. 1-9.

Device 1102a or 1102b can also access other data and content over one or more wired and/or wireless networks 1110. For example, content publishers, such as news sites, Really Simple Syndication (RSS) feeds, Web sites and developer networks can be accessed by device 1102a or 1102b. Such access can be provided by invocation of a web browsing function or application (e.g., a browser) running on the device 1102a or 1102b.

Devices 1102a and 1102b can exchange files over one or more wireless or wired networks 1110 either directly or through course manager service 1130.

Exemplary Device Architecture

Figure 12:
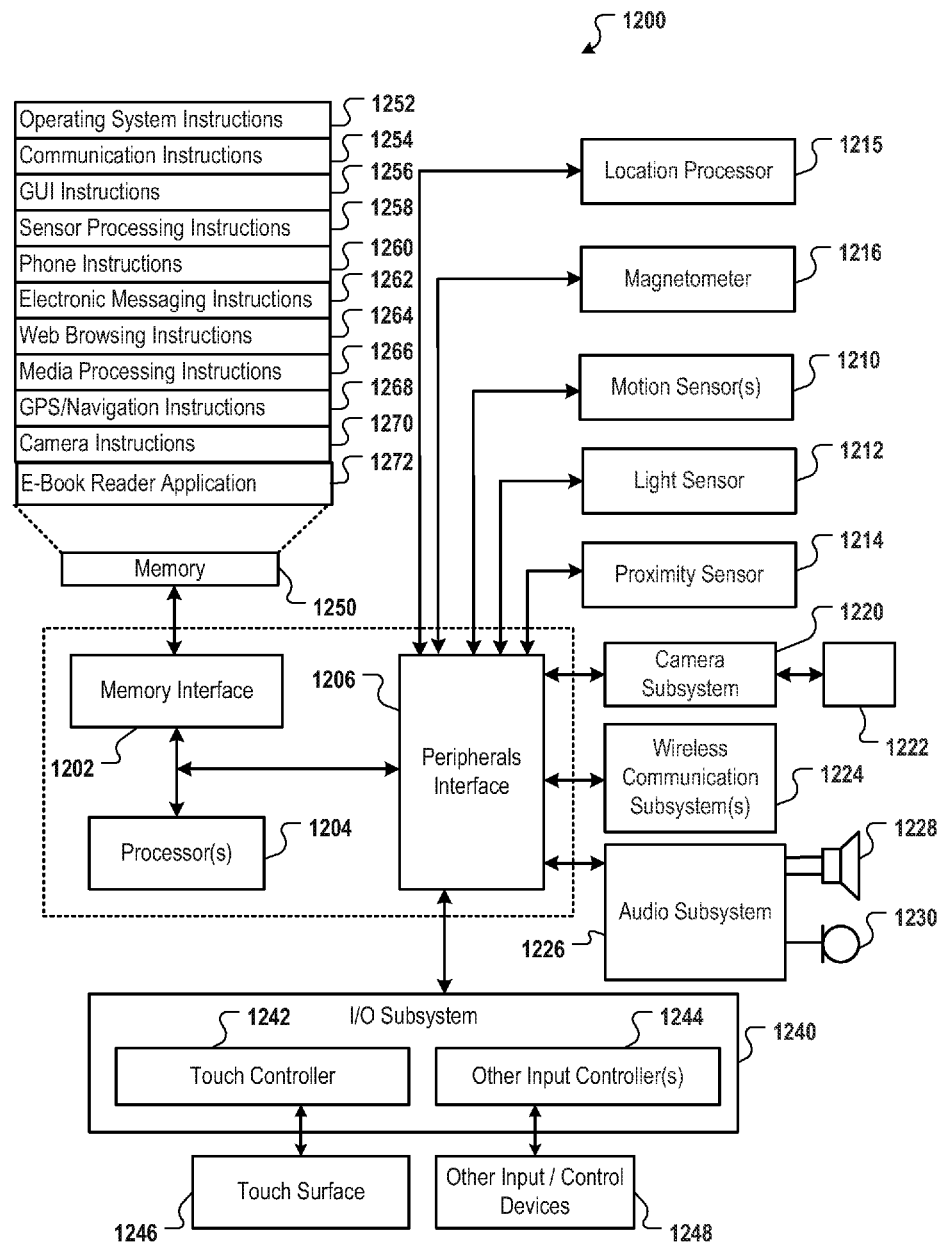
FIG. 12 is a block diagram of an exemplary architecture for a device capable of receiving a network-enabled content authoring application.

FIG. 12 is a block diagram of an exemplary architecture for a device capable of running a network-enabled content authoring application. Architecture 1200 can be implemented in any device for generating the features described in reference to FIGS. 1-9, including but not limited to portable or desktop computers, smart phones and electronic tablets, television systems, game consoles, kiosks and the like. Architecture 1200 can include memory interface 1202, data processor(s), image processor(s) or central processing unit(s) 1204, and peripherals interface 1206. Memory interface 1202, processor(s) 1204 or peripherals interface 1206 can be separate components or can be integrated in one or more integrated circuits. The various components can be coupled by one or more communication buses or signal lines.

Sensors, devices, and subsystems can be coupled to peripherals interface 1206 to facilitate multiple functionalities. For example, motion sensor 1210, light sensor 1212, and proximity sensor 1214 can be coupled to peripherals interface 1206 to facilitate orientation, lighting, and proximity functions of the device. For example, in some implementations, light sensor 1212 can be utilized to facilitate adjusting the brightness of touch surface 1246. In some implementations, motion sensor 1210 (e.g., an accelerometer, gyros) can be utilized to detect movement and orientation of the device. Accordingly, display objects or media can be presented according to a detected orientation (e.g., portrait or landscape).

Other sensors can also be connected to peripherals interface 1206, such as a temperature sensor, a biometric sensor, or other sensing device, to facilitate related functionalities.

Location processor 1215 (e.g., GPS receiver) can be connected to peripherals interface 1206 to provide geo-positioning. Electronic magnetometer 1216 (e.g., an integrated circuit chip) can also be connected to peripherals interface 1206 to provide data that can be used to determine the direction of magnetic North. Thus, electronic magnetometer 1216 can be used as an electronic compass.

Camera subsystem 1220 and an optical sensor 1222, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 1224. Communication subsystem(s) 1224 can include one or more wireless communication subsystems. Wireless communication subsystems 1224 can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data. The specific design and implementation of the communication subsystem 1224 can depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., WiFi, WiMax, or 3G networks), code division multiple access (CDMA) networks, and a Bluetooth™ network. Communication subsystems 1224 may include hosting protocols such that the device may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 1226 can be coupled to a speaker 1228 and one or more microphones 1230 to facilitate voice-enabled functions, such as voice recognition, voice replication, digital recording, and telephony functions.

I/O subsystem 1240 can include touch controller 1242 and/or other input controller(s) 1244. Touch controller 1242 can be coupled to a touch surface 1246. Touch surface 1246 and touch controller 1242 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 1246. In one implementation, touch surface 1246 can display virtual or soft buttons and a virtual keyboard, which can be used as an input/output device by the user.

Other input controller(s) 1244 can be coupled to other input/control devices 1248, such as one or more buttons, rocker switches, thumb-wheel, infrared port, USB port, and/ or a pointer device such as a stylus. The one or more buttons (not shown) can include an up/down button for volume control of speaker 1228 and/or microphone 1230.

In some implementations, device 1200 can present recorded audio and/or video files, such as MP3, AAC, and MPEG files. In some implementations, device 1200 can include the functionality of an MP3 player and may include a pin connector for tethering to other devices. Other input/ output and control devices can be used.

Memory interface 1202 can be coupled to memory 1250. Memory 1250 can include high-speed random access memory or non-volatile memory, such as one or more magnetic disk storage devices, one or more optical storage devices, or flash memory (e.g., NAND, NOR). Memory 1250 can store operating system 1252, such as Darwin, RTXC, LINUX, UNIX, OS X, WINDOWS, or an embedded operating system such as VxWorks. Operating system 1252 may include instructions for handling basic system services and for performing hardware dependent tasks. In some implementations, operating system 1252 can include a kernel (e.g., UNIX kernel).

Memory 1250 may also store communication instructions 1254 to facilitate communicating with one or more additional devices, one or more computers or servers. Communication instructions 1254 can also be used to select an operational mode or communication medium for use by the device, based on a geographic location (obtained by the GPS/Navigation instructions 1268) of the device. Memory 1250 may include graphical user interface instructions 1256 to facilitate graphic user interface processing, such as generating the GUIs shown in FIGS. 1-9; sensor processing instructions 1258 to facilitate sensor-related processing and functions; phone instructions 1260 to facilitate phone-related processes and functions; electronic messaging instructions 1262 to facilitate electronic-messaging related processes and functions; web browsing instructions 1264 to facilitate web browsing-related processes and functions and display GUIs described in reference to FIGS. 1-9; media processing instructions 1266 to facilitate media processing-related processes and functions; GPS/Navigation instructions 1268 to facilitate GPS and navigation-related processes; camera instructions 1270 to facilitate camera-related processes and functions; and instructions 1272 for an e-book reader application that is capable of displaying GUIs, as described in reference to FIGS. 1-9. The memory 1250 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 1250 can include additional instructions or fewer instructions. Furthermore, various functions of the mobile device may be implemented in hardware and/or in software, including in one or more signal processing and/or application specific integrated circuits.

Network Service Architecture

Figure 13:
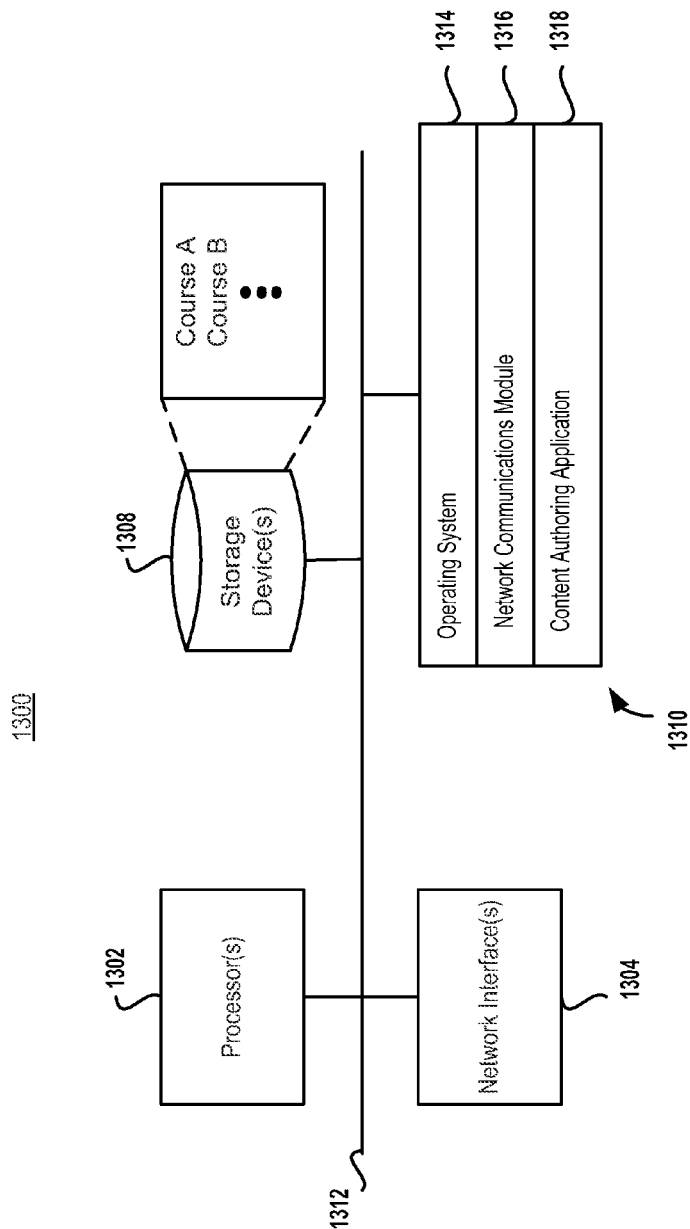
FIG. 13 is a block diagram of an exemplary architecture for a network service capable of providing a network-enabled content authoring application.

FIG. 13 is a block diagram of an exemplary architecture 1300 for a network service (e.g., service 1130 of FIG. 11) capable of providing a network-enabled content authoring application. In some implementations, architecture 1300 can include processors or processing cores 1302 (e.g., dual-core Intel® Xeon® Processors), network interface(s) 1304 (e.g., network interface cards), storage device 1308 and memory 1310. Each of these components can be coupled to one or more buses 1312, which can utilize various hardware and software for facilitating the transfer of data and control signals between components.

Memory 1310 can include operating system 1314 (e.g., Apple Inc.'s OS X Lion Server), network communications module 1316 and content authoring application 1318. Operating system 1314 can be multi-user, multiprocessing, multitasking, multithreading, real time, etc. Operating system 1314 can perform basic tasks, including but not limited to: recognizing input from and providing output to client devices; keeping track and managing files and directories on computer-readable mediums (e.g., memory 1310 or storage device 1308); controlling peripheral devices; and managing traffic on the one or more buses 1312. Network communications module 1316 can include various components for establishing and maintaining network connections with client devices (e.g., software for implementing communication protocols, such as TCP/IP, HTTP, etc.).

The term "computer-readable medium" refers to any medium that participates in providing instructions to processor(s) 1302 for execution, including without limitation, non-volatile media (e.g., optical or magnetic disks), volatile media (e.g., memory) and transmission media. Transmission media includes, without limitation, coaxial cables, copper wire and fiber optics.

Architecture 1300 can serve Web pages for content authoring application 1318, as described in reference to FIGS. 1-9. Storage device 1308 can store courses created by instructors on client devices using network-enabled content authoring application 1318 and account information for authors and students.

The features described can be implemented in digital electronic circuitry or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer can communicate with mass storage devices for storing data files. These mass storage devices can include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with an author, the features can be implemented on a computer having a display device such as a CRT (cathode ray tube) or LCD (liquid crystal display) monitor for displaying information to the author and a keyboard and a pointing device such as a mouse or a trackball by which the author can provide input to the computer.

The features can be implemented in a computer system that includes a back-end component, such as a data server or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a LAN, a WAN and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an Application Programming Interface (API). An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, many of the examples presented in this document were presented in the context of an ebook. The systems and techniques presented herein are also applicable to other electronic text such as electronic newspaper, electronic magazine, electronic documents etc. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method performed by one or more hardware processors comprising:
   receiving a first request to create a new post for an academic course;
   in response to receiving the request to create a new post, displaying on a display a plurality of user interface elements for authoring content for the academic course, the user interface elements including at least a message pane that includes one or more editable fields and an assignment pane with a first affordance for activating the assignment pane;
   receiving a request to activate the first affordance; and
   in response to receiving the request to activate the first affordance, displaying one or more new user interface elements within the assignment pane, wherein the one or more new user interface elements enable details about an assignment to be added to the new post.

2. The method of claim 1, further comprising:
displaying a side bar including an index of page descriptors for the course, the page descriptors selectable for navigating to a page in the course.

3. The method of claim 2, further comprising:
displaying proximate to one or more page descriptors a number corresponding with a number of posts associated with the page in the course.

4. The method of claim 1, further comprising:
in response to receiving the request to activate the first affordance, displaying at least a second affordance within the assignment pane for attaching materials to the assignment to be added to the new post.

5. The method of claim 4, further comprising:
receiving a request to activate a second affordance; and
in response to receiving the request to activate the second affordance, displaying a menu of options for attaching the material to the assignment to be added to the new post.

6. The method of claim 1, further comprising:
expanding the assignment pane when adding the one or more new user interface elements.

7. The method of claim 1, further comprising:
in response to receiving the request to activate the first affordance, displaying at least a second affordance proximate to the assignment pane for adding additional assignments;
receiving a request to activate the second affordance; and
in response to receiving the request to activate the second affordance, displaying one or more additional user interface elements within the assignment pane, wherein the one or more additional user interface elements enable details about one or more additional assignments to be added to the new post.

8. The method of claim 7, wherein the details about the assignment and the one or more additional assignments to be added to the post include at least two different associated due dates.

9. The method of claim 1, wherein the details about the assignment to be added to the new post include a due date associated with the assignment to be added to the new post.

10. The method of claim 1, further comprising:
displaying a second affordance on the display for selecting a topic;
receiving a topic selection from the second affordance; and
in response to receiving the topic selection from the second affordance, associating the new post with the selected topic.

11. The method of claim 1, further comprising:
displaying a second affordance within the message pane for disabling a text editor in the message pane;
receiving a request to deactivate the second affordance; and
in response to receiving the request to deactivate the second affordance, disabling the text editor in the message pane.

12. The method of claim 1, wherein the message pane is separate from the assignment pane.

13. The method of claim 1, further comprising:
displaying a second affordance for completing the new post;
receiving a request to activate the second affordance; and
in response to receiving the request to activate the second affordance, completing the new post including a message and, when the first affordance is activated, one or more assignments.

14. A system comprising:
one or more processors;
memory coupled to the one or more processors and configured for storing instructions, which, when executed by the one or more processors, causes the one or more processors to perform operations comprising:
receiving a first request to create a new post for an academic course;
in response to receiving the request to create a new post, displaying on a display a plurality of user interface elements for authoring content for the academic course, the user interface elements including at least a message pane that includes one or more editable fields and an assignment pane with a first affordance for activating the assignment pane;
receiving a request to activate the first affordance; and
in response to receiving the request to activate the first affordance, displaying one or more new user interface elements within the assignment pane, wherein the one or more new user interface elements enable details about an assignment to be added to the new post.

15. The system of claim 14, the operations further comprising:
displaying a side bar including an index of page descriptors for the course, the page descriptors selectable for navigating to a page in the course.

16. The system of claim 15, the operations further comprising:
displaying proximate to one or more page descriptors a number corresponding with a number of posts associated with the page in the course.

17. The system of claim 14, the operations further comprising:
in response to receiving the request to activate the first affordance, displaying at least a second affordance within the assignment pane for attaching materials to the assignment to be added to the new post.

18. The system of claim 17, the operations further comprising:
receiving a request to activate a second affordance; and
in response to receiving the request to activate the second affordance, displaying a menu of options for attaching the material to the assignment to be added to the new post.

19. The system of claim 14, the operations further comprising:
expanding the assignment pane when adding the one or more new user interface elements.

20. The system of claim 14, the operations further comprising:
in response to receiving the request to activate the first affordance, displaying at least a second affordance proximate to the assignment pane for adding additional assignments;
receiving a request to activate the second affordance; and
in response to receiving the request to activate the second affordance, displaying one or more additional user interface elements within the assignment pane, wherein the one or more additional user interface elements enable details about one or more additional assignments to be added to the new post.

21. The system of claim 20, wherein the details about the assignment and the one or more additional assignments to be added to the post include at least two different associated due dates.

22. The system of claim 14, wherein the details about the assignment to be added to the new post include a due date associated with the assignment to be added to the new post.

23. The system of claim 14, the operations further comprising:
displaying a second affordance on the display for selecting a topic;
receiving a topic selection from the second affordance; and
in response to receiving the topic selection from the second affordance, associating the new post with the selected topic.

24. The system of claim 14, the operations further comprising:
displaying a second affordance within the message pane for disabling a text editor in the message pane;
receiving a request to deactivate the second affordance; and
in response to receiving the request to deactivate the second affordance, disabling the text editor in the message pane.

25. The system of claim 14, wherein the message pane is separate from the assignment pane.

26. The system of claim 14, the operations further comprising:
displaying a second affordance for completing the new post;
receiving a request to activate the second affordance; and
in response to receiving the request to activate the second affordance, completing the new post including a message and, when the first affordance is activated, one or more assignments.

27. A non-transitory computer readable storage medium, the computer readable medium containing instructions that, when executed by one or more hardware processors, can perform a method, the method comprising:
receiving a first request to create a new post for an academic course;
in response to receiving the request to create a new post, displaying on a display a plurality of user interface elements for authoring content for the academic course, the user interface elements including at least a message pane that includes one or more editable fields and an assignment pane with a first affordance for activating the assignment pane;
receiving a request to activate the first affordance; and
in response to receiving the request to activate the first affordance, displaying one or more new user interface elements within the assignment pane, wherein the one or more new user interface elements enable details about an assignment to be added to the new post.

28. The non-transitory computer readable storage medium of claim 27, the method further comprising:
displaying a side bar including an index of page descriptors for the course, the page descriptors selectable for navigating to a page in the course.

29. The non-transitory computer readable storage medium of claim 28, further comprising:
displaying proximate to one or more page descriptors a number corresponding with a number of posts associated with the page in the course.

30. The non-transitory computer readable storage medium of claim 27, the method further comprising:
in response to receiving the request to activate the first affordance, displaying at least a second affordance within the assignment pane for attaching materials to the assignment to be added to the new post.

31. The non-transitory computer readable storage medium of claim 30, the method further comprising:
receiving a request to activate a second affordance; and
in response to receiving the request to activate the second affordance, displaying a menu of options for attaching the material to the assignment to be added to the new post.

32. The non-transitory computer readable storage medium of claim 27, the method further comprising:
expanding the assignment pane when adding the one or more new user interface elements.

33. The non-transitory computer readable storage medium of claim 27, the method further comprising:
in response to receiving the request to activate the first affordance, displaying at least a second affordance proximate to the assignment pane for adding additional assignments;
receiving a request to activate the second affordance; and
in response to receiving the request to activate the second affordance, displaying one or more additional user interface elements within the assignment pane, wherein the one or more additional user interface elements enable details about one or more additional assignments to be added to the new post.

34. The non-transitory computer readable storage medium of claim 33, wherein the details about the assignment and the one or more additional assignments to be added to the post include at least two different associated due dates.

35. The non-transitory computer readable storage medium of claim 27, wherein the details about the assignment to be added to the new post include a due date associated with the assignment to be added to the new post.

36. The non-transitory computer readable storage medium of claim 27, the method further comprising:
displaying a second affordance on the display for selecting a topic;
receiving a topic selection from the second affordance; and
in response to receiving the topic selection from the second affordance, associating the new post with the selected topic.

37. The non-transitory computer readable storage medium of claim 27, the method further comprising:
displaying a second affordance within the message pane for disabling a text editor in the message pane;
receiving a request to deactivate the second affordance; and
in response to receiving the request to deactivate the second affordance, disabling the text editor in the message pane.

38. The non-transitory computer readable storage medium of claim 27, wherein the message pane is separate from the assignment pane.

39. The non-transitory computer readable storage medium of claim 27, the method further comprising:
displaying a second affordance for completing the new post;
receiving a request to activate the second affordance; and
in response to receiving the request to activate the second affordance, completing the new post including a message and, when the first affordance is activated, one or more assignments.

\* \* \* \* \*